(12) United States Patent
Oetken et al.

(10) Patent No.: US 12,367,282 B2
(45) Date of Patent: Jul. 22, 2025

(54) BIT-LEVEL DATA EXTRACTION AND THREAT DETECTION

(71) Applicant: Quantum Star Technologies Inc., Coeur d'Alene, ID (US)

(72) Inventors: Garrett Thomas Oetken, Post Falls, ID (US); Henry Stoltenberg, Walnut Creek, CA (US)

(73) Assignee: Quantum Star Technologies Inc., Coeur d'Alene, ID (US)

( * ) Notice: Subject to any disclaimer, the term of this patent is extended or adjusted under 35 U.S.C. 154(b) by 0 days.

(21) Appl. No.: 18/600,516

(22) Filed: Mar. 8, 2024

(65) Prior Publication Data
US 2024/0330453 A1  Oct. 3, 2024

Related U.S. Application Data

(63) Continuation of application No. 17/185,884, filed on Feb. 25, 2021, now abandoned.

(51) Int. Cl.
| | | |
|---|---|---|
| *G06F 21/56* | (2013.01) | |
| *G06N 7/01* | (2023.01) | |
| *G06N 20/00* | (2019.01) | |

(52) U.S. Cl.
CPC ............ *G06F 21/562* (2013.01); *G06N 7/01* (2023.01); *G06N 20/00* (2019.01); *G06F 2221/033* (2013.01)

(58) Field of Classification Search
CPC ........ G06N 20/00; G06N 7/01; G06F 21/562; G06F 2221/033
See application file for complete search history.

(56) References Cited

U.S. PATENT DOCUMENTS

| | | |
|---|---|---|
| 7,209,221 B2 | 4/2007 | Breed et al. |
| 7,593,013 B2 | 9/2009 | Agutter et al. |
| 7,836,504 B2 | 11/2010 | Ray et al. |

(Continued)

FOREIGN PATENT DOCUMENTS

| | | |
|---|---|---|
| WO | 2016179438 A1 | 11/2016 |
| WO | 2018031940 A1 | 2/2018 |

(Continued)

OTHER PUBLICATIONS

NPL Search Terms (Year: 2024).*

(Continued)

*Primary Examiner* — Syed A Zaidi
(74) *Attorney, Agent, or Firm* — Chang & Hale LLP

(57) ABSTRACT

Techniques and architectures include representing data with one or more n-dimensional representations and using one or more analysis models to identify target properties associated with the one or more n-dimensional representations. For example, data can be represented as a plurality of points in a coordinate system. A set of points in the plurality of points can be identified and an n-dimensional model can be generated for the set of points. The n-dimensional model can be compared to a plurality of n-dimensional models that are tagged as including a target property associated with malicious behavior, benign behavior, and/or a vulnerability. Based on the comparison, a likelihood can be determined that the data includes the target property.

20 Claims, 9 Drawing Sheets

(56) References Cited

U.S. PATENT DOCUMENTS

| | | | |
|---|---|---|---|
| 8,042,184 B1 * | 10/2011 | Batenin | H04L 63/145 |
| | | | 711/147 |
| 8,131,565 B2 | 3/2012 | Dicks et al. | |
| 8,131,566 B2 | 3/2012 | Dicks et al. | |
| 8,151,352 B1 | 4/2012 | Novitchi | |
| 8,364,136 B2 | 1/2013 | Hoffberg et al. | |
| 8,392,996 B2 | 3/2013 | Oliver et al. | |
| 8,468,244 B2 | 6/2013 | Redlich et al. | |
| 8,516,266 B2 | 8/2013 | Hoffberg et al. | |
| 8,533,581 B2 | 9/2013 | Krall et al. | |
| 8,584,241 B1 | 11/2013 | Jenks et al. | |
| 8,701,192 B1 | 4/2014 | Glick et al. | |
| 8,949,233 B2 | 2/2015 | Hsiao et al. | |
| 9,104,870 B1 | 8/2015 | Qu et al. | |
| 9,164,679 B2 | 10/2015 | Smith | |
| 9,182,914 B1 | 11/2015 | Smith | |
| 9,332,028 B2 | 5/2016 | Xaypanya et al. | |
| 9,432,298 B1 | 8/2016 | Smith | |
| 9,525,696 B2 | 12/2016 | Kapoor et al. | |
| 9,588,872 B2 | 3/2017 | Revanna et al. | |
| 9,684,775 B2 | 6/2017 | Gupta et al. | |
| 9,690,938 B1 | 6/2017 | Saxe et al. | |
| 9,712,532 B2 | 7/2017 | Krall et al. | |
| 9,910,986 B1 | 3/2018 | Saxe et al. | |
| 9,922,190 B2 | 3/2018 | Antonakakis et al. | |
| 9,998,483 B2 | 6/2018 | Sukhomlinov et al. | |
| 10,073,972 B2 | 9/2018 | Saxena et al. | |
| 10,193,902 B1 | 1/2019 | Caspi et al. | |
| 10,218,718 B2 | 2/2019 | Kopp et al. | |
| 10,235,519 B2 | 3/2019 | Guy et al. | |
| 10,248,533 B1 * | 4/2019 | Shah | G06F 11/3006 |
| 10,303,875 B1 | 5/2019 | Saxe et al. | |
| 10,333,965 B2 | 6/2019 | Gathala et al. | |
| 10,339,593 B2 | 7/2019 | Beckham | |
| 10,346,465 B2 | 7/2019 | Gao et al. | |
| 10,395,032 B2 | 8/2019 | Keller et al. | |
| 10,552,292 B2 | 2/2020 | Olshanetsky et al. | |
| 10,552,727 B2 | 2/2020 | Caspi et al. | |
| 10,601,783 B2 | 3/2020 | Ickes et al. | |
| 10,609,050 B2 | 3/2020 | Caspi et al. | |
| 10,656,724 B2 | 5/2020 | Kramer et al. | |
| 10,664,602 B2 | 5/2020 | Grafi | |
| 10,692,004 B1 | 6/2020 | Segev | |
| 10,703,381 B2 | 7/2020 | Bender et al. | |
| 10,789,526 B2 | 9/2020 | Wilson et al. | |
| 10,803,174 B2 | 10/2020 | Oetken | |
| 10,817,602 B2 | 10/2020 | Ladnai et al. | |
| 10,819,718 B2 | 10/2020 | David et al. | |
| 10,824,722 B1 | 11/2020 | Tevet et al. | |
| 10,839,955 B2 | 11/2020 | Accomazzi et al. | |
| 10,877,752 B2 | 12/2020 | Chen et al. | |
| 11,042,631 B2 | 6/2021 | Ghosh et al. | |
| 11,074,497 B2 | 7/2021 | Ascari et al. | |
| 11,086,311 B2 | 8/2021 | Cella et al. | |
| 11,106,598 B2 | 8/2021 | Zhang et al. | |
| 11,144,047 B2 | 10/2021 | Cella et al. | |
| 11,166,012 B2 | 11/2021 | Sugio | |
| 11,175,653 B2 | 11/2021 | Cella et al. | |
| 11,176,691 B2 | 11/2021 | Ghadyali et al. | |
| 11,210,392 B2 | 12/2021 | Salem et al. | |
| 11,210,569 B2 | 12/2021 | Qian et al. | |
| 11,243,528 B2 | 2/2022 | Cella et al. | |
| 11,321,210 B2 | 5/2022 | Huang et al. | |
| 11,363,043 B2 | 6/2022 | Murphy et al. | |
| 11,397,579 B2 | 7/2022 | Zhang et al. | |
| 11,429,701 B2 * | 8/2022 | Fukuda | G06T 7/00 |
| 11,449,668 B2 | 9/2022 | Mann et al. | |
| 11,463,457 B2 | 10/2022 | Bazalgette et al. | |
| 11,475,351 B2 | 10/2022 | Luo et al. | |
| 11,481,918 B1 | 10/2022 | Ebrahimi Afrouzi et al. | |
| 11,483,599 B2 | 10/2022 | Yang et al. | |
| 11,500,788 B2 | 11/2022 | Miller et al. | |
| 11,575,936 B2 | 2/2023 | Wang et al. | |
| 11,580,218 B2 | 2/2023 | Salem et al. | |
| 11,593,658 B2 | 2/2023 | Liu et al. | |
| 11,615,288 B2 | 3/2023 | Ceulemans et al. | |
| 11,630,666 B2 | 4/2023 | Zhang et al. | |
| 11,677,981 B2 | 6/2023 | Han et al. | |
| 11,698,967 B2 | 7/2023 | Jennings et al. | |
| 11,714,908 B2 | 8/2023 | Oetken | |
| 11,775,634 B2 | 10/2023 | Saxena et al. | |
| 11,783,571 B2 | 10/2023 | Hoshino et al. | |
| 11,843,575 B2 | 12/2023 | Saxena | |
| 11,847,550 B2 | 12/2023 | Dally et al. | |
| 11,882,317 B2 | 1/2024 | Sugio et al. | |
| 11,899,463 B1 | 2/2024 | Ebrahimi Afrouzi et al. | |
| 11,909,952 B2 | 2/2024 | Sugio | |
| 11,915,146 B2 | 2/2024 | Tokui et al. | |
| 11,983,534 B2 | 5/2024 | Chen et al. | |
| 12,001,935 B2 | 6/2024 | Sjögren et al. | |
| 12,069,086 B2 | 8/2024 | Marshall | |
| 12,073,215 B2 | 8/2024 | Zhang et al. | |
| 2002/0191842 A1 | 12/2002 | Kajitani et al. | |
| 2003/0023864 A1 | 1/2003 | Muttik et al. | |
| 2003/0112254 A1 | 6/2003 | Ishihara | |
| 2005/0132206 A1 | 6/2005 | Palliyil et al. | |
| 2005/0210056 A1 | 9/2005 | Pomerantz et al. | |
| 2006/0095732 A1 | 5/2006 | Tran et al. | |
| 2006/0123244 A1 | 6/2006 | Gheorghescu et al. | |
| 2007/0188494 A1 | 8/2007 | Agutter et al. | |
| 2009/0267946 A1 | 10/2009 | Agutter et al. | |
| 2011/0041179 A1 | 2/2011 | Ståhlberg | |
| 2011/0063403 A1 | 3/2011 | Zhang et al. | |
| 2011/0283174 A1 | 11/2011 | M'Raihi et al. | |
| 2012/0017262 A1 | 1/2012 | Kapoor et al. | |
| 2012/0246171 A1 | 9/2012 | Teerlink | |
| 2012/0255018 A1 | 10/2012 | Sallam | |
| 2013/0269042 A1 | 10/2013 | Krall et al. | |
| 2013/0275384 A1 | 10/2013 | Sivasubramanian et al. | |
| 2013/0290565 A1 * | 10/2013 | Kamakura | H04W 12/06 |
| | | | 709/245 |
| 2014/0047544 A1 * | 2/2014 | Jakobsson | G06F 21/566 |
| | | | 726/23 |
| 2014/0215621 A1 | 7/2014 | Xaypanya et al. | |
| 2015/0101053 A1 * | 4/2015 | Sipple | H04L 63/1425 |
| | | | 726/24 |
| 2015/0309813 A1 * | 10/2015 | Patel | G06F 21/577 |
| | | | 703/22 |
| 2015/0319182 A1 | 11/2015 | Natarajan et al. | |
| 2015/0365423 A1 | 12/2015 | Prokopi et al. | |
| 2016/0021174 A1 | 1/2016 | Vilchez et al. | |
| 2016/0224787 A1 | 8/2016 | Guy et al. | |
| 2016/0246701 A1 | 8/2016 | Revanna et al. | |
| 2016/0328562 A1 | 11/2016 | Saxena et al. | |
| 2016/0350532 A1 | 12/2016 | Davis et al. | |
| 2016/0359701 A1 | 12/2016 | Pang et al. | |
| 2016/0371532 A1 | 12/2016 | Shi et al. | |
| 2017/0169208 A1 | 6/2017 | Jantz et al. | |
| 2017/0264619 A1 | 9/2017 | Narayanaswamy et al. | |
| 2018/0063168 A1 | 3/2018 | Sofka | |
| 2018/0082193 A1 | 3/2018 | Cormier et al. | |
| 2018/0096230 A1 | 4/2018 | Luan et al. | |
| 2018/0107591 A1 | 4/2018 | Smith | |
| 2018/0197089 A1 * | 7/2018 | Krasser | H04L 41/145 |
| 2018/0219891 A1 * | 8/2018 | Jain | H04L 63/1425 |
| 2018/0247682 A1 | 8/2018 | Gajapathy | |
| 2018/0300484 A1 | 10/2018 | Sethumadhavan et al. | |
| 2019/0014153 A1 | 1/2019 | Lang et al. | |
| 2019/0042743 A1 | 2/2019 | Chen | |
| 2019/0054347 A1 | 2/2019 | Saigh et al. | |
| 2019/0065563 A1 | 2/2019 | Petculescu et al. | |
| 2019/0129404 A1 | 5/2019 | Cella et al. | |
| 2019/0130073 A1 | 5/2019 | Sun et al. | |
| 2019/0199736 A1 | 6/2019 | Howard et al. | |
| 2019/0205244 A1 | 7/2019 | Smith | |
| 2019/0260795 A1 | 8/2019 | Araiza et al. | |
| 2019/0272375 A1 | 9/2019 | Chen | |
| 2019/0273509 A1 | 9/2019 | Elkind et al. | |
| 2019/0273510 A1 | 9/2019 | Elkind et al. | |
| 2019/0339685 A1 | 11/2019 | Cella et al. | |
| 2019/0339686 A1 | 11/2019 | Cella et al. | |
| 2019/0339688 A1 | 11/2019 | Cella et al. | |
| 2019/0342324 A1 | 11/2019 | Nawy et al. | |
| 2020/0004938 A1 | 1/2020 | Brannon et al. | |

(56) References Cited

U.S. PATENT DOCUMENTS

| | | |
|---|---|---|
| 2020/0045063 A1 | 2/2020 | Zhang |
| 2020/0089212 A1 | 3/2020 | Cella et al. |
| 2020/0089886 A1 | 3/2020 | Oetken |
| 2020/0103894 A1 | 4/2020 | Cella et al. |
| 2020/0150643 A1 | 5/2020 | Cella et al. |
| 2020/0167258 A1 | 5/2020 | Chattopadhyay et al. |
| 2020/0210575 A1 | 7/2020 | Huang et al. |
| 2020/0351519 A1 | 11/2020 | Sugio et al. |
| 2020/0364088 A1 | 11/2020 | Ashwathnarayan et al. |
| 2020/0366941 A1 | 11/2020 | Sugio et al. |
| 2021/0012538 A1 | 1/2021 | Wang et al. |
| 2021/0021869 A1 | 1/2021 | Wang et al. |
| 2021/0034813 A1 | 2/2021 | Wu et al. |
| 2021/0042413 A1 | 2/2021 | Oetken |
| 2021/0117768 A1 | 4/2021 | Liu et al. |
| 2021/0150263 A1 | 5/2021 | Corwin et al. |
| 2021/0173916 A1* | 6/2021 | Ortiz ............... H04L 9/3231 |
| 2021/0212694 A1 | 7/2021 | Shelton, IV et al. |
| 2021/0216630 A1 | 7/2021 | Karr |
| 2021/0216633 A1 | 7/2021 | Lee et al. |
| 2021/0216648 A1 | 7/2021 | Child et al. |
| 2021/0216666 A1 | 7/2021 | Miller et al. |
| 2021/0248027 A1 | 8/2021 | Alonso et al. |
| 2022/0057519 A1 | 2/2022 | Goldstein et al. |
| 2022/0114262 A1 | 4/2022 | Bhatia et al. |
| 2022/0147629 A1 | 5/2022 | Vasilenko et al. |
| 2022/0159261 A1 | 5/2022 | Oh |
| 2022/0188425 A1 | 6/2022 | Wyatt et al. |
| 2022/0269784 A1 | 8/2022 | Oetken et al. |
| 2022/0383082 A1 | 12/2022 | Zhang et al. |
| 2022/0391415 A1 | 12/2022 | Singh et al. |
| 2023/0009127 A1 | 1/2023 | Boyer |
| 2023/0084574 A1 | 3/2023 | Hicks et al. |
| 2023/0111071 A1 | 4/2023 | Cella et al. |
| 2023/0114719 A1 | 4/2023 | Thomas et al. |
| 2023/0186201 A1 | 6/2023 | Cella et al. |
| 2023/0196230 A1 | 6/2023 | Cella et al. |
| 2023/0196626 A1 | 6/2023 | Wang et al. |
| 2023/0228577 A1 | 7/2023 | Belt et al. |
| 2023/0252145 A1 | 8/2023 | Kim |
| 2023/0254340 A1 | 8/2023 | Kim |
| 2023/0306113 A1 | 9/2023 | Kim |
| 2024/0045659 A1 | 2/2024 | Siebel et al. |
| 2024/0062871 A1 | 2/2024 | Hull et al. |
| 2024/0126220 A1 | 4/2024 | Drees et al. |
| 2024/0155142 A1 | 5/2024 | Sugio et al. |
| 2024/0184886 A1 | 6/2024 | Kutner et al. |
| 2024/0281726 A1 | 8/2024 | Paturi et al. |

FOREIGN PATENT DOCUMENTS

| | | |
|---|---|---|
| WO | 2018103736 A1 | 6/2018 |
| WO | 2019156141 A1 | 8/2019 |
| WO | 2019198636 A1 | 10/2019 |
| WO | 2019203297 A1 | 10/2019 |
| WO | 2021036905 A1 | 3/2021 |
| WO | 2021046567 A1 | 3/2021 |
| WO | 2021057746 A1 | 4/2021 |
| WO | 2021155971 A1 | 8/2021 |

OTHER PUBLICATIONS

Non-final office action dated Apr. 23, 2021 for U.S. Appl. No. 17/185,884, 33 pages.
EP Search Report for Appl. No. 19860921.6, dated May 2, 2022, 11 pages.
Final Office Action for U.S. Appl. No. 17/185,884, dated Aug. 11, 2021, 33 pages.
Final Office Action for U.S. Appl. No. 17/185,884, dated May 3, 2022, 16 pages.
Final Office Action in U.S. Appl. No. 17/185,884, dated Aug. 11, 2021, 16 pages.
Final Rejection for U.S. Appl. No. 17/185,884, dated Dec. 8, 2023, 17 pages.
Final Rejection for U.S. Appl. No. 17/185,884, dated Feb. 14, 2023, 27 pages.
Han, KyoungSoo, BooJoong Kang, and Eul Gyu Im, Malware analysis using visualized image matrices, The Scientific World Journal, 2014, 15 pages.
International Preliminary Report on Patentability and Written Opinion for Appl. No. PCT/US2022/017510, dated Aug. 29, 2023, 6 pages.
International Search Report dated Nov. 15, 2019 for PCT/US2019/051196, 2 pages.
Li Chen et al., STAMINA: Scalable Deep Learning Approach for Malware Classification, Apr. 2020 [online], 11 pages, [retrieved on May 15, 2020]. Retrieved from the Internet: URL: https://www.intel.com/content/www/us/en/artificial-intelligence/documents/stamina-deep-learning-for-malware-protection-whitepaper.html.
Moser et al., "Limits of Static Analysis for Malware Detections", The Twenty-Third Annual Computer Security Applications Conference (ACSAC 2007), Dec. 14, 2007, 11 pages.
Nikolopoulos, Stavros D., and Iosif Polenakis, "A graph-based model for malware detection and classification using system-call groups," Journal of Computer Virology and Hacking Techniques 13.1 (2017): 29-46, 2017, 18 pages.
Non-Final Office Action for U.S. Appl. No. 17/185,884, dated Apr. 23, 2021, 24 pages.
Non-Final Office Action for U.S. Appl. No. 17/185,884, dated Jan. 14, 2022, 16 pages.
Non-Final Rejection for U.S. Appl. No. 17/185,884, dated Aug. 23, 2023, 27 pages.
Non-Final Rejection for U.S. Appl. No. 17/185,884, dated Sep. 26, 2022, 17 pages.
Non-Final Rejection for U.S. Appl. No. 18/324,957, dated Dec. 21, 2023, 89 pages.
Notice Of Allowance for U.S. Appl. No. 17/068,280, dated Jan. 26, 2022, 33 pages.
Notice of Allowance for Appl. No. 1656978, dated Jun. 8, 2020 12 pages.
Notice of Allowance for U.S. Appl. No. 17/068,280 dated Jul. 20, 2022, 13 pages.
Notice of Allowance for U.S. Appl. No. 17/068,280, dated Feb. 23, 2023, 12 pages.
Notice of Allowance for U.S. Appl. No. 17/068,280 dated May 13, 2022, 13 pages.
Notice of Allowance for Israeli Appl. No. 281410, dated Jun. 22, 2022, 3 pages.
Notice of Allowance for Israeli Pat. Appl. No. 281410, dated Jun. 6, 2022, 3 pages.
Notification of Transmittal of the International Search Report and the Written Opinion of the International Searching Authority for PCT/US2019/051196, Nov. 15, 2019, 1 page.
NPL Search Terms, 2021, 1 page.
NPL Search Terms, 2022, 1 page.
Search Report for appl. No. PCT/US2022/017510, dated Mar. 16, 2022, 2 pages.
Written Opinion for appl. No. PCT/US2022/017510, dated Mar. 16, 2022, 5 pages.
Written Opinion of ISA dated Nov. 15, 2019 for PCT/US2019/051196, 6 pages.
Z3rotrust, "Digital Steganography as an Advanced Malware Detection Evasion Technique", Aug. 30, 2018, 49 pages.

* cited by examiner

BIT-LEVEL DATA EXTRACTION AND THREAT DETECTION

CROSS-REFERENCE TO RELATED APPLICATIONS

This application is a continuation of U.S. application Ser. No. 17/185,884, filed Feb. 25, 2021, and entitled "N-Dimensional Model Techniques and Architectures for Data Protection," the entire contents of which is incorporated herein by reference.

BACKGROUND

Anti-malware tools are implemented to prevent, detect, and remove malware that threatens computing devices. These tools use pattern matching, heuristic analysis, behavioral analysis, or hash matching to identify malware. Although these techniques provide some level of security, the anti-malware tools are slow to adapt to changing malware, reliant on humans to flag or verify malware, slow to process data, and require exact matches between data and pre-flagged malware. This often leaves computing devices exposed to malware for relatively long periods of time, causing various undesirable issues.

BRIEF DESCRIPTION OF THE DRAWINGS

Various embodiments are depicted in the accompanying drawings for illustrative purposes and should in no way be interpreted as limiting the scope of the disclosure. In addition, various features of different disclosed embodiments can be combined to form additional embodiments, which are part of this disclosure. In the figures, the left-most digit(s) of a reference number identifies the figure in which the reference number first appears. Throughout the drawings, reference numbers may be reused to indicate correspondence between reference elements.

DETAILED DESCRIPTION

Figure 1:
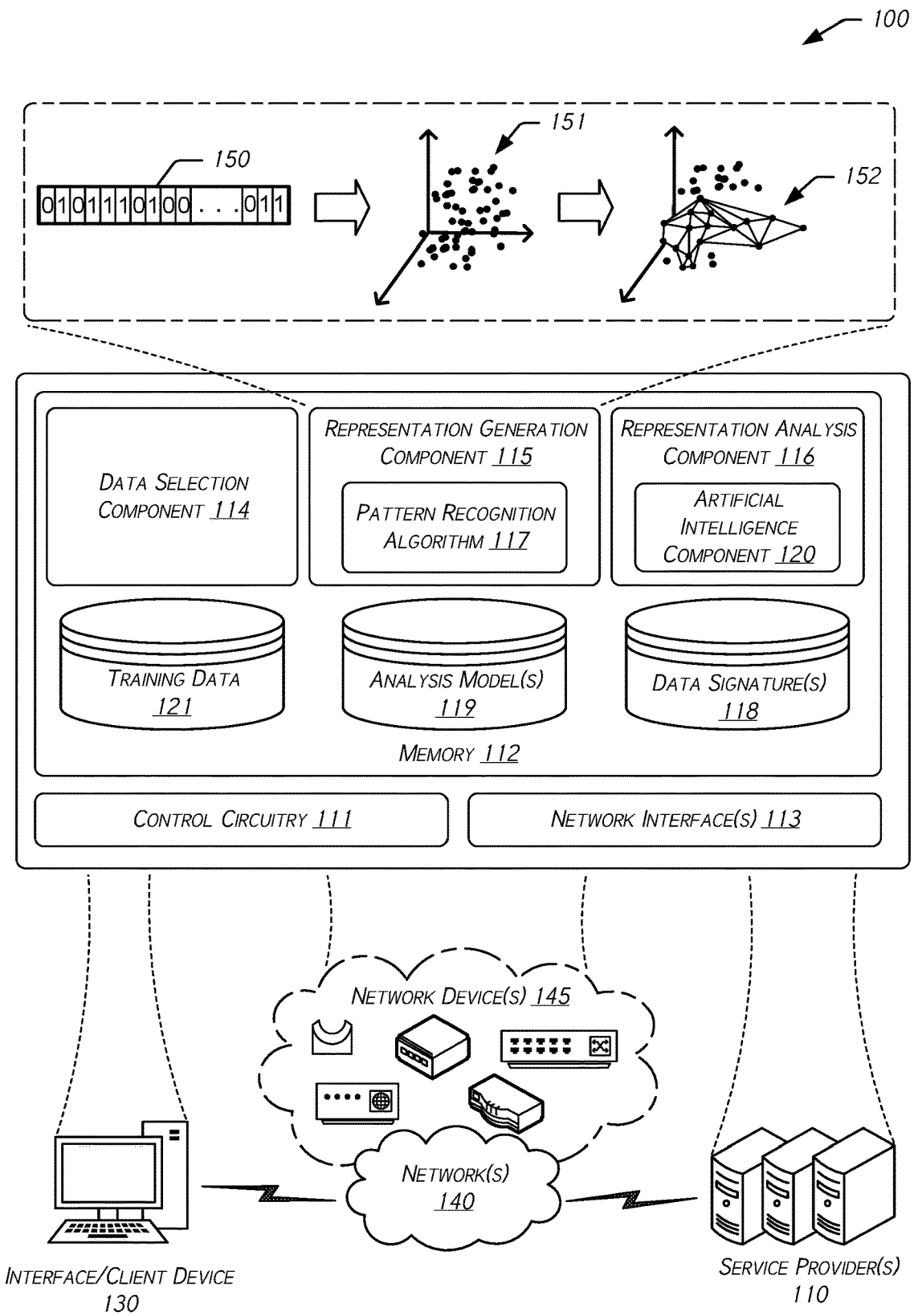
FIG. 1 illustrates an example architecture in which the techniques described herein may be implemented.

This disclosure describes techniques and architectures for representing data with one or more n-dimensional representations and using one or more analysis models to identify target properties associated with the one or more n-dimensional representations. For example, the techniques and architectures may receive data of any type and process the data at a bit or byte level to generate one or more n-dimensional representations for the data. To generate a representation, the techniques and architectures may represent groups of bits within the data as points within a coordinate system, with a set of bits within a group of bits representing a coordinate for a point. The techniques and architectures may use the points as the n-dimensional representation and/or generate a model or another representation based on the points (e.g., a mesh, wireframe, etc.). As such, the n-dimensional representation may be generated to include one or more of the points and/or a model or other representation for one or more of the points. The n-dimensional representation may represent a data signature for the data. In some instances, the points within the coordinate space are analyzed to generate multiple n-dimensional representations (e.g., identify multiple sets of points and generate a model for each set of points).

The techniques and architectures may evaluate an n-dimensional representation based on one or more analysis representations that have been tagged as being associated with a target property (e.g., threat, interruption, nuisance, etc.), such as malware, vulnerability, or another security-related issue. For example, a two-dimensional (2D) or three-dimensional (3D) model representing a portion of the data may be compared to 2D or 3D models that have been previously tagged as being associated with malicious data. If the data model is substantially similar to one or more of the malicious models, a threat or potential threat may be detected. In some instances, if a threat or potential threat is detected, the data model and/or data model within the coordinate system may be analyzed to determine an actual threat, a type of a threat, a source of a threat (e.g., an entity that generated the threat/data), and so on. Further, various operations may be performed to address a target property, such as removing a threat, ensuring that the threat is not associated with the data, providing a notification/message regarding the threat, or another operation.

The techniques and architectures discussed herein may provide various security measures to efficiently and/or accurately detect target properties for data (e.g., threats). For example, the techniques and architectures may represent data in an n-dimensional representation and process the n-dimensional representation with a model that efficiently and/or accurately detects various types of threats to the data, such as malware or other malicious data. In some embodiments, since the techniques and architectures operate at a bit or byte level to generate a representation of the data, any type of data may be processed (e.g., the techniques and architectures are agnostic to data type, environment type, etc.). For example, the techniques and architectures may be implemented for various types of data, such as file system data, network traffic data, runtime data, non-image-based data, data stored in volatile memory, data stored in non-volatile memory, behavioral data, and so on, and/or implemented for various environments, such as different operating systems, platforms, and so on. Moreover, in some embodiments, the techniques and architectures may detect target properties by processing just a portion of data (e.g., a portion of a file, etc.), which may further increase the efficiency of the techniques and architectures. Furthermore, in some embodiments, the techniques and architectures may detect target properties without human involvement. Additionally, the techniques and architectures may efficiently utilize computing resources, such as by comparing a data model to target models to identify a potential threats, interruptions, nuisances, etc., which may be relatively faster and/or require less computational resources in comparison to other solutions.

The techniques and architectures discussed herein can be applied to detect a variety of types of target properties. A target property can refer to/include malicious behavior (e.g., malicious data intended to damage an environment/system/device), benign behavior (e.g., data/behavior that is not malicious), a vulnerability (e.g., vulnerability data that may make an environment/system/device vulnerable to an attack), or any other security-related characteristic that may potentially pose a threat, interruption, nuisance, vulnerability, and so on. Although various examples refer to malicious threats, the techniques and architectures are applicable to any type of target property.

Although many embodiments and examples are discussed herein in the context of two- or three-dimensional representations for ease of discussion and illustration, the techniques and architectures may be implemented for a representation of any number of dimensions. That is, an n-dimensional representation may comprise a one-dimensional representation, a two-dimensional representation, a three-dimensional representation, a four-dimensional representation, and so on. In examples, each dimension of a representation can refer to a characteristic of data. For instance, a four-dimensional representation for data can include three dimensions that correspond to spatial values (e.g., to form a 3D surface model) for the data and one dimension that represents another characteristic of the data, such as any type of value, metadata, etc. that is associated with the data and/or generated from the data. Further, although some embodiments and examples are discussed herein in the context of cybersecurity, the techniques and architectures can be implemented within a wide variety of contexts, such as industrial control systems, network traffic, physical security, system memory, isolated environments, and so on.

Moreover, although certain embodiments and examples are disclosed herein, the disclosure extends beyond the specifically disclosed embodiments to other alternative embodiments and/or uses, and to modifications and equivalents thereof. Thus, the scope of the claims that may arise here from is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as described herein without necessarily achieving other aspects or advantages as may also be described or suggested herein.

FIG. 1 illustrates an example architecture 100 in which the techniques described herein may be implemented. The architecture 100 includes one or more service providers 110 (also referred to as "the service provider 110," for ease of discussion) configured to communicate with one or more interface/client devices 130 (also referred to as "the client device 130," for ease of discussion) over one or more networks 140 (also referred to as "the network 140," for ease of discussion). For example, the service provider 110 can perform processing remotely/separately from the client device 130 and communicate with the client device 130 to facilitate such processing for the client device 130 and/or another device. The service provider 110 and/or the client device 130 can be configured to facilitate various functionality. As shown, the network 140 can include one or more network devices 145 (also referred to as "the network device 145," for ease of discussion) to facilitate communication over the network 140. The service provider 110, the client device 130, and/or the network device 145 may be configured to perform any of the techniques/functionality discussed herein, which may generally process data to detect a threat or potential threat. Although example devices are illustrated in the architecture 100, any of such devices may eliminated/not implemented. In one example, the service provider 110 may implement the techniques discussed herein without communicating with the client device 130 and/or without using the network 140. In another example, the client device 130 may implement the techniques without communicating with the service provider 110 and/or without using the network 140.

The service provider 110 may be implemented as one or more computing devices, such as one or more servers, one or more desktop computers, one or more laptops computers, or any other type of device configured to process data. In some embodiments, the one or more computing devices are configured in a cluster, data center, cloud computing environment, or a combination thereof. In some embodiments, the one or more computing devices of the service provider 110 are implemented as a remote computing resource that is located remotely to the client device 130. In other embodiments, the one or more computing devices of the service provider 110 are implemented as local resources that are located locally at the client device 130.

The client device 130 may be implemented as one or more computing devices, such as one or more desktop computers, laptops computers, servers, smartphones, electronic reader devices, mobile handsets, personal digital assistants, portable navigation devices, portable gaming devices, tablet computers, wearable devices (e.g., a watch), portable media players, televisions, set-top boxes, computer systems in a vehicle, appliances, cameras, security systems, home-based computer systems, projectors, and so on.

In some examples, the client device 130 includes one or more input/output (I/O) components, such as one or more displays, microphones, speakers, keyboards, mice, cameras, and so on. The one or more displays may be configured to display data associated with certain aspects of the present disclosure. For example, the one or more displays may be configured to present a graphical user interface (GUI) to facilitate operation of the client device 130, present information associated with an evaluation of data (e.g., information indicating if a threat is detected, a type of threat detected, etc.), provide input to cause an operation to be performed to address a threat (e.g., an operation to have a threat removed, prevent a threat from associated with and/or further corrupting data, prevent a threat from being stored with data, etc.), and so on. The one or more displays may include a liquid-crystal display (LCD), a light-emitting diode (LED) display, an organic LED display, a plasma display, an electronic paper display, or any other type of technology. In some embodiments, the one or more displays include one or more touchscreens and/or other user input/output (I/O) devices.

The network device 145 may include one or more routers, bridges, switches, repeaters, modems, gateways, hubs, wireless access points, servers, network interface controllers, or any other device/hardware configured to facilitate reception/transmission of data from/to another component.

As shown, the service provider 110, client device 130, and/or network device 145 may include control circuitry 111, memory 112, and/or one or more network interfaces 113 configured to perform functionality described herein. For ease of discussion and illustration, the control circuitry 111, memory 112, and one or more network interfaces 113 are shown in blocks above the service provider 110, client device 130, and network device 145. It should be understood that, in many embodiments, the service provider 110, client device 130, and/or network device 145 can each include separate instances of the control circuitry 111, memory 112, and network interface 113. For example, the service provider 110 can include its own control circuitry, data storage/memory, and/or network interface (e.g., to implement processing on the service provider 110), the network device 145 can include its own control circuitry, data storage/memory, and/or network interface (e.g., to implement processing on the network device 145), and/or the client device 130 can include its own control circuitry, data storage/memory, and/or network interface (e.g., to implement processing on the client device 130). As such, reference herein to control circuitry/memory may refer to circuitry/memory embodied in the service provider 110, client device 130, and/or network device 145.

Although the control circuitry 111 is illustrated as a separate component from the memory 112 and network interface 113, it should be understood that the memory 112 and/or the network interface 113 can be embodied at least in part in the control circuitry 111. For instance, the control circuitry 111 can include various devices (active and/or passive), semiconductor materials and/or areas, layers, regions, and/or portions thereof, conductors, leads, vias, connections, and/or the like, wherein one or more of the memory 112 and the network interface 113 and/or portion(s) thereof can be formed and/or embodied at least in part in/by such circuitry components/devices.

The control circuitry 111 may include one or more processors, processing circuitry, processing modules/units, chips, dies (e.g., semiconductor dies including come or more active and/or passive devices and/or connectivity circuitry), microprocessors, micro-controllers, digital signal processors (DSPs), microcomputers, central processing units (CPUs), graphics processing units (GPUs), field programmable gate arrays (FPGAs), programmable logic devices, state machines (e.g., hardware state machines), logic circuitry, analog circuitry, digital circuitry, application specific integrated circuits (ASICs), field-programmable gate arrays (FPGAs), program-specific standard products (ASSPs), complex programmable logic devices (CPLDs), and/or any device that manipulates signals (analog and/or digital) based on hard coding of the circuitry and/or operational instructions. Control circuitry can further comprise one or more, storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The memory 112 (as well as any other memory discussed herein) may include any suitable or desirable type of computer-readable media. For example, one or more computer-readable media may include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other data types. One or more computer-readable media that may include, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that may be used to store information for access by a computing device. As used in certain contexts herein, computer-readable media may not generally refer to communication media, such as modulated data signals and carrier waves. As such, computer-readable media should generally be understood to refer to non-transitory media.

The control circuitry 111, memory 112, and/or network interface 113 can be electrically and/or communicatively coupled using certain connectivity circuitry/devices/features, which can or may not be part of control circuitry 111. For example, the connectivity feature(s) can include one or more printed circuit boards configured to facilitate mounting and/or interconnectivity of at least some of the various components/circuitry. In some embodiments, two or more of the components may be electrically and/or communicatively coupled to each other.

The memory 112 may store a data selection component 114, a representation generation component 115, and a representation analysis component 116, which can include executable instructions that, when executed by the control circuitry 111, cause the control circuitry 111 to perform various operations discussed herein. For example, one or more of the components 114-116 may include software/firmware modules. However, one or more of the components 114-116 may be implemented as one or more hardware logic components, such as one or more application specific integrated circuits (ASIC), field-programmable gate arrays (FPGAs), program-specific standard products (ASSPs), complex programmable logic devices (CPLDs), and/or the like. For ease of discussion, the components 114-116 are illustrated as separate components. However, it should be understood that one or more of the components 114-116 may be implemented as any number of components to implement the functionality discussed herein (e.g., combined or separated into additional components).

The data selection component 114 can be configured to select a portion of data for the representation generation component 115 and/or representation analysis component 116 to process. For example, the data selection component 114 can select a number of bits/bytes of data and/or a particular portion of the data, such as a predetermined number of bits/bytes (e.g., 1500 bits/bytes, 15,0000 bits/bytes, 500 bits/bytes, and so on), header/footer/body data, metadata, a particular number of bits/bytes within a particular portion the data, and so on. In examples, the data selection component 114 can determine a type of the data (e.g., file system data, network traffic data, runtime data, non-image-based data, data stored in volatile memory, data stored in non-volatile memory, behavioral data, and so on) and select a particular portion of the data and/or a number of bits/bytes based on the type of data. For instance, it may be determined through machine learning or other techniques that evaluating a particular section of data (e.g., a header, a footer, a section of a payload, etc.) for a particular type of data accurately detects any threats associated with the type of data by more than a threshold (e.g., 99% of the time). As such, the data selection component 114 may select the particular section within each piece of data (e.g., file) and refrain from selecting other sections of the piece of data. Further, in examples, the data selection component 114 can analyze the data to generate entropy data indicating a randomness of one or more portions of data and select a particular portion of the data and/or a number of bits/bytes based on the entropy data. The entropy data may indicate a randomness of a portion of the data relative to other portions of the data and/or a threshold. In some instances, a portion of data that is selected is a most/least random portion and/or has a randomness value above/below a threshold. In some instances, a Shannon entropy algorithm is implemented.

The representation generation component 115 may generally be configured to process/analyze data to generate an n-dimensional representation of the data. For example, the representation generation component 115 may retrieve/receive data 150 from a component/device/system and process (e.g., parse) the data 150 in groups of bits to determine points for a coordinate system. Each group of bits may include one or more sets of bits that represent one or more coordinates, respectively. For example, the representation generation component 115 may extract three bytes of data (e.g., a group of bits) and represent each byte (e.g., set of bits) with a coordinate for a point. In particular, the representation generation component 115 can convert each byte into a coordinate value for a coordinate system (e.g., a value from 0 to 255). For instance, a first byte in a group of bits may represent an x-coordinate (e.g., x-value from 0 to 255 on a coordinate system), a second byte in the group of bits may represent a y-coordinate for the point (e.g., y-value from 0 to 255 on the coordinate system), and a third byte in the group of bits may represent z-coordinate for the point (e.g., z-value from 0 to 255 on the coordinate system). The representation generation component 115 may process any number of bits in the data 150 to determine any number of points for the data 150. Although some examples are discussed herein in the context of three bytes representing a group of bits and a byte representing a set of bits, a group of bits and/or a set of bits may include any number of bits or bytes.

The representation generation component 115 may generate an n-dimensional representation based on coordinates of points. For example, the representation generation component 115 can position each point within a coordinate system using one or more coordinates for the point (e.g., position a point based on a x-coordinate value, y-coordinate value, and z-coordinate value). In some embodiments, the points produced by such process form an n-dimensional representation (e.g., a point cloud), such as an 3D point representation 151 illustrated in FIG. 1. Further, in some embodiments, the points produced by such process may be used to form an n-dimensional representation. For instance, the representation generation component 115 may use a pattern recognition algorithm 117 to identify a set of points that are associated with particular characteristic(s). Such pattern recognition algorithm 117 can generally seek to identify points that are within a particular distance from each other, positioned on a virtual surface/plane, and/or otherwise include characteristics that may indicate that the set of points may form a surface. The representation generation component 115 can generate an n-dimensional representation based on the set of points, such as a 3D model 152 illustrated in FIG. 1. In examples, a model is a polygon mesh that includes one or more vertices, edges, faces, polygons, surfaces, and so on. Further, in examples, a model is a wire-frame model that includes one or more vertices, edges, and so on. However, other types of models can be implemented. Further, the representation generation component 115 can generate other types of n-dimensional representations, such as an n-dimensional map. An example process of generating an n-dimensional point representation is illustrated and discussed in reference to FIG. 2.

In some instances, the representation generation component 115 generates multiple models/representation for different sets of points within data. For example, the pattern recognition algorithm 117 can identify different sets of points, and the representation generation component 115 can generate a model for each set of points, resulting in multiple models within a coordinate space/system. Further, as noted above, in some instances, the representation generation component 115 processes data that is selected by the data selection component 114. For example, the representation generation component 115 can generate an n-dimensional representation for a particular portion of data that is selected by the data selection component 114. Moreover, in some instances, the data 150 includes a plurality of units of data, such as a plurality of files, and the representation generation component 115 generates an n-dimensional representation for each of the units of data.

An n-dimensional representation, such as the n-dimensional representation 151 or the n-dimensional representation 152, may include a variety of representations, such as an n-dimensional point cloud or other plurality of points, an n-dimensional map, an n-dimensional model (e.g., mesh model, wireframe model, etc.), and so on. The term "n" may represent any integer. In some embodiments, an n-dimensional representation may include surfaces. In some embodiments, an n-dimensional representation may be visualized by a human, while in other embodiments an n-dimensional representation may not able to be visualized by a human. In some embodiments, data representing an n-dimensional representation (e.g., coordinates of points, surfaces, etc.) may be stored in an array, matrix, list, or any other data structure. In some instances, an n-dimensional representation is stored as a data signature 118 in a data signature(s) data store. For example, a data signature for a piece of data can be points or one or more models for the piece of data generated by the representation generation component 115.

An n-dimensional representation may be represented within a coordinate system. A coordinate system may include a number line, a cartesian coordinate system, a polar coordinate system, a homogeneous coordinate system, a cylindrical or spherical coordinate system, etc. As noted above, although many examples are discussed herein in the context of two- or three-dimensional representations represented in two- or three-dimensional coordinate systems, the techniques and architectures may generate a representation of any number of dimensions and/or a representation may be represented in any type of coordinate system.

In some embodiments, the representation generation component 115 generates multiple representations for the same data (e.g., a unit of data, such as a file). In some examples, the representation generation component 115 may generate a two-dimensional representation for data and generate a three-dimensional representation for the same data. Further, in some examples, the representation generation component 115 may generate a three-dimensional representation for data using a process that represents three bytes of continuous bits as an x-coordinate, a y-coordinate, and a z-coordinate, in that order. The representation generation component 115 may also generate a three-dimensional representation for the same data using a process that represents three bytes of continuous bits as a y-coordinate, a z-coordinate, and an x-coordinate, in that order. In any event, representing data with multiple representations may be useful to provide multiple layers of evaluation of the data (e.g., when evaluating the data with the representation analysis component 116 to detect any threats). As such, the representation generation component 115 may generate multiple representations for data using different coordinate systems and/or different manners of processing the data.

In some embodiments, the representation generation component 115 and/or the representation analysis component 116 processes a portion of data while refraining from processing another portion of the data (or at least initially refraining from processing the other portion). For example, the representation generation component 115 may process a predetermined number of bytes of each file, such as a first 1500 bytes of each file, a second 1500 bytes of each file, or a last 1500 bytes of each file, to generate an n-dimensional representation for the file. In some embodiments, an initial portion of data (e.g., a file) may include a header that designates execution points within the data. In cases where malware or other threats are associated with a header and/or execution points, which may frequently be the case, the representation generation component 115 may efficiently process data by generating an n-dimensional representation based on just the data within the header. In some instances, the representation generation component 115 processes just a portion of data that is selected by the data selection component 114. However, any portions of data may be processed.

Data, such as the data 150, may be a variety of types of data, such as audio data, video data, text data (e.g., text files, email, etc.), binary data (e.g., binary files), image data, network traffic data (e.g., data protocol units exchanged over a network, such as segments, packets, frames, etc.), file system data (e.g., files), runtime data (e.g., data generated during runtime of an application, which may be stored in volatile memory), data stored in volatile memory, data stored in non-volatile memory, application data (e.g., executable data for one or more applications), data associated with an isolated environment (e.g., data generated or otherwise associated with a virtual machine, data generated or otherwise associated with a trusted execution environment, data generated or otherwise associated with an isolated cloud service, etc.), metadata, behavioral data (e.g., data describing behaviors taken by a program during runtime), location data (e.g., geographical/physical location data of a device, user, etc.), quality assurance data, financial data, financial analytics data, healthcare analytics data, and so on. Data may be formatted in a variety of manners and/or according a variety of standards. In some examples, data includes a header, payload, and/or footer section. Data may include multiple pieces of data (e.g., multiple files or other units of data) or a single piece of data (e.g., a single file or another unit of data). In some embodiments, data includes non-image-based data, such as data that is not initially intended/formatted to be represented within a coordinate system (e.g., not stored in a format that is intended for display). In contrast, image-based data may generally be intended/formatted for display, such as images, 2D models, 3D models, point cloud data, and so on. In some embodiments, a type of data may be defined by or based on a format of the data, a use of the data, an environment in which the data is stored or used (e.g., an operating system, device platform, etc.), a device that generated the data, a size of the data, an age of the data (e.g., when the data was created), and so on.

The representation analysis component 116 may be configured to analyze an n-dimensional representation, such as the n-dimensional point representation 151 or the n-dimensional model representation 152. The representation analysis component 116 may generally use an analysis model(s) 119 stored in an analysis model data store. The analysis model(s) 119 can include one or more machine/human-trained models and/or other types of models, which can implement techniques/algorithms for detecting a threat(s). The one or more analysis models 119 models may include models configured for different types of data, different coordinate systems, different types of n-dimensional representations, and so on. The representation analysis component 116 can use the one or more analysis models 119 to process an n-dimensional representation (generated by the representation generation component 115) to generate a confidence value/data indicating a likelihood that an n-dimensional includes malicious data. In examples, the representation analysis component 116 can determine if an n-dimensional representation includes malicious data (e.g., if a confidence value is above a threshold).

In some instances, the representation analysis component 116 is configured to compare an n-dimensional representation to one or more n-dimensional representations that have been tagged as malicious. For example, a 2D or 3D model for data can be compared to 2D or 3D models for malicious code to determine a similarity of the 2D or 3D data model to the 2D or 3D malicious code models. Here, the representation analysis component 116 can be configured to compare a similarity between surfaces, edges, volume, area, and/or any other characteristic of a model. The representation analysis component 116 can generate a confidence/similarity value indicating a similarity of the 2D or 3D data model to the 2D or 3D malicious data models.

In some instances, the representation analysis component 116 includes an Artificial Intelligence (AI) component 120 configured to train a model to create a machine-trained model that is configured to analyze an n-dimensional representation to detect a threat. For example, the AI component 120 may analyze training data 121 from a training data store that includes one or more n-dimensional representations that are tagged as being associated with a threat (e.g., malicious code) and/or one or more n-dimensional representations that are tagged as being threat free (e.g., not associated with a threat). An n-dimensional representation may be tagged (e.g., categorized) by a user and/or a system. The AI component 120 may analyze the training data 121 to generate one or more machine-trained models, such as one or more artificial neural networks or another Artificial Intelligence model. The AI component 120 may store the one or more machine-trained models within the data store for the analysis model(s) 119.

In some embodiments of training a model, the AI component 120 may learn one or more characteristics that are associated with an n-dimensional representation(s) of malicious data and train a machine-trained model to detect such one or more characteristics. For example, the AI component 120 may use pattern recognition, feature detection, shape/surface detection, and/or a spatial analysis to identify one or more characteristics and/or patterns of one or more characteristics. In some embodiments, a characteristic may include: a spatial feature (e.g., a computer vision/image processing feature, such as edges, corners (interest points), blobs (regions of interest points), ridges, etc.), a feature of an n-dimensional representation, a marker of an n-dimensional representation, a number of models that may generally be associated with malicious data (e.g., an average/greatest/smallest number of models within a coordinate system for malicious data), a relationship between models (within a coordinate system) that are associated with malicious data (e.g., an average/longest/shortest distance between malicious data models), a shape of a model(s) that is associated with malicious data (e.g., a type of shape), a size of a model(s) that is associated with malicious data (e.g., an average/largest/smallest size of an average model), a volume of a model(s) that is associated with malicious data (e.g., an average/largest/smallest size of an average model), an area of a model(s) that is associated with malicious data, a number of surfaces of a model(s) that is associated with malicious data (e.g., an average/largest/smallest number of surfaces for a model), a location of a model(s) that is associated with malicious data within a coordinate system (e.g., an average position), a position of a malicious model(s) to another malicious model within a coordinate system, a number of models within the coordinate space that are associated with malicious data (e.g., an average/largest/smallest number of a models), a characteristic(s) of a particular type of malicious data, and so on. However, a characteristic may include any characteristic of an n-dimensional representation and/or coordinate system, whether visualizable/spatial or non-visualizable/non-spatial. Training a model may include machine learning or other AI techniques.

In some embodiments, the AI component 120 may train one or more models for different types of threats. For example, a model may be trained to detect/identify malware, a particular type of malware (e.g., a virus, spyware, ransomware, polymorphic malware, a particular type of virus, a particular type of spyware, a particular type of ransomware, a particular type of polymorphic malware, etc.), and so on. To illustrate, the AI component 120 may learn that a particular characteristic (e.g., feature) in an n-dimensional representation is associated with a virus or a particular type of virus and train a model to detect the particular characteristic and/or to identify the particular characteristic as being associated with the virus or the particular type of virus. In some embodiments, the AI component 120 may train a first model to detect/identify a first type of threat and train a second model to detect/identify a second type of threat.

The AI component 120 may be configured to process an n-dimensional representation with a machine-trained model(s) or any other model. For example, the AI component 120 may receive the n-dimensional representation 151/152 from the representation generation component 115 and process the n-dimensional representation 151/152 with a machine-trained model to identify any threats associated with the n-dimensional representation 151/152. In some embodiments, the AI component 120 may identify a type of threat associated with an n-dimensional representation, such as malware, a particular type of malware (e.g., a virus, spyware, ransomware, polymorphic malware, a particular type of virus, a particular type of spyware, a particular type of ransomware, a particular type of polymorphic malware, etc.), and so on. In some embodiments, the processing includes pattern recognition, feature detection, and/or a spatial analysis, which may include identifying one or more characteristics (e.g., features) within an n-dimensional representation.

In some embodiments, the representation analysis component 116 may be configured to use different models to analyze one or more n-dimensional representations. In one example, the representation analysis component 116 may process an n-dimensional representation with a first model and process the n-dimensional representation with a second model. The representation analysis component 116 may detect a threat if either analysis detects a threat (e.g., either one of the confidence values is above a threshold). Further, in another example, the representation analysis component 116 can process an n-dimensional representation a first time with a first model. If a confidence value is within a range or otherwise satisfies one or more criteria of potentially being associated with malicious data, the representation analysis component 116 can process the n-dimensional representation (or a portion thereof) a second time with a second model. The representation analysis component 116 may detect a threat if a confidence value from the second model satisfies one or more criteria (e.g., is above a threshold). In some instances, the second model may require more (or less) computational resources, time, etc. As such, in some cases, the representation analysis component 116 can use a multiple layered approach to process an n-dimensional representation(s), wherein each layer can be associated with a different model. In some instances of processing a same n-dimensional representation multiple times, the representation analysis component 116 may provide more accurate results regarding any potential threats. However, processing an n-dimensional representation once may be sufficient or just as accurate in many instances.

A threat (sometimes referred to as "malicious data") may include malware, phishing, a rootkit, a bootkit, a logic bomb, a backdoor, a screen scraper, a physical threat (e.g., an access point without security measures, such as leaving a door open, etc.), and so on. Malware may include a virus, spyware, adware, a worm, a Trojan horse, scareware, ransomware, polymorphic malware, and so on. In some embodiments, a threat may result from any data, software, or other component that has malicious intent.

In some embodiments, the representation analysis component 116 may detect a physical threat associated with data. For example, the representation generation component 115 may process data representing a physical environment, such as images of the interior or exterior of a building and generate an n-dimensional representation for the data. The representation analysis component 116 may process the n-dimensional representation to identify a potential threat, such as an access point that may potentially be at risk of a break-in due to reduced security features at the access point. Furthermore, the representation analysis component 116 may be configured to detect a variety of other types of threats.

The representation analysis component 116 may be configured to provide a variety of types of output regarding processing of an n-dimensional representation. For example, based on processing an n-dimensional representation with the one or more analysis models 118, the representation analysis component 116 may determine if the n-dimensional representation is associated with any threats, determine the types of threats (if any), where the threat is located in the data, a source of the threat (e.g., a content creator that generated the threat, an entity involved in distributing the threat, etc.). In some embodiments, the representation analysis component 116 may generate information (e.g., a report, notification, a threat rating, signal, etc.) indicating if a threat was detected, a type of threat that was detected, a confidence value of a detected threat (e.g., a rating on a scale of 1 to 10 of a confidence that data includes a threat, with 10 (or 1) being the highest confidence that the data includes a threat), where a threat is located in data, a source of a threat, and so on. In some examples, the representation analysis component 116 may provide the information to the client device 130 (e.g., in a message), which may display the information via a user interface and/or another manner. A user may view information provided via the user interface and/or cause an operation to be performed, such as having a threat removed from the data, replacing the malicious data with other data, preventing a threat from further corrupting the data, preventing a threat from being stored with the data, and so on. Further, in some examples, the representation analysis component 116 may provide the information to another device/system and/or cause an operation to be performed automatically to address any threats.

As noted above, the data selection component 114, representation generation component 115, and/or representation analysis component 116 can be implemented in a variety of context across a variety of devices/system. For example, one or more of the data selection component 114, representation generation component 115, and representation analysis component 116 may be implemented at the service provider 110, network device 145, and/or client device 130. In some illustrations, one or more instances of the data selection component 114, representation generation component 115, and/or representation analysis component 116 are implemented at one or more of the service provider 110, network device 145, and the client device 130. Further, as also noted above, the service provider 110 can include one or more service providers implemented as one or more computing devices, which may collectively or individually implement the data selection component 114, representation generation component 115, and/or representation analysis component 116. As such, the functionality of the data selection component 114, representation generation component 115, and the representation analysis component 116 may be divided in a variety of manners across a variety of different devices/systems/components, which may or may not operate in cooperation to evaluate data.

The data selection component 114, representation generation component 115, and/or representation analysis component 116 may be configured to evaluate data at any time. In one example, an evaluation of data is performed in response to a request by the client device 130, such as a user providing input through the client device 130 to analyze data. For instance, a user (not illustrated) may employ the client device 130 to initiate an evaluation of data and the service provider 110 may provide a message back to the client device 130 regarding the evaluation, such as information indicating whether or not a threat was detected, a type of threat detected, and so on. A user can include an end-user, an administrator (e.g., an Information Technology (IT) individual), or any other individual. In another example, an evaluation of data is performed periodically and/or in response to a non-user-based request received by the client device 130, service provider 110, network device 145, and/or another device. In yet another example, an evaluation of data is performed when data is received/sent/downloaded.

The one or more network interfaces 113 may be configured to communicate with one or more devices over a communication network. For example, the one or more network interfaces 113 may send/receive data in a wireless or wired manner over one or more networks 140, which can include one or more personal area networks (PAN), local area networks (LANs), wide area networks (WANs), Internet area networks (IANs), cellular networks, the Internet, etc. In some embodiments, the one or more network interfaces 113 may implement a wireless technology such as Bluetooth, Wi-Fi, near field communication (NFC), or the like.

The data store for the training data 121, analysis model(s) 119, and/or data signature(s) 118 may be associated with any entity and/or located at any location. In some examples, a data store is associated with a first entity (e.g., company, environment, etc.) and the service provider 110/network device(s) 145/client device 130 is associated with a second entity that provides a service to evaluate data. For instance, a data store may be implemented in a cloud environment or locally at a facility to store a variety of forms of data and the service provider 110 may evaluate the data to provide information regarding security of the data, such as whether or not the data includes malicious data. In some examples, a data store and the service provider 110/network device(s) 145/client device 130 are associated with a same entity and/or located at a same location. As such, although various data stores are illustrated in the example of FIG. 1 as being located within the memory 112, in some examples a data store may be included within another device/system.

Figure 2:
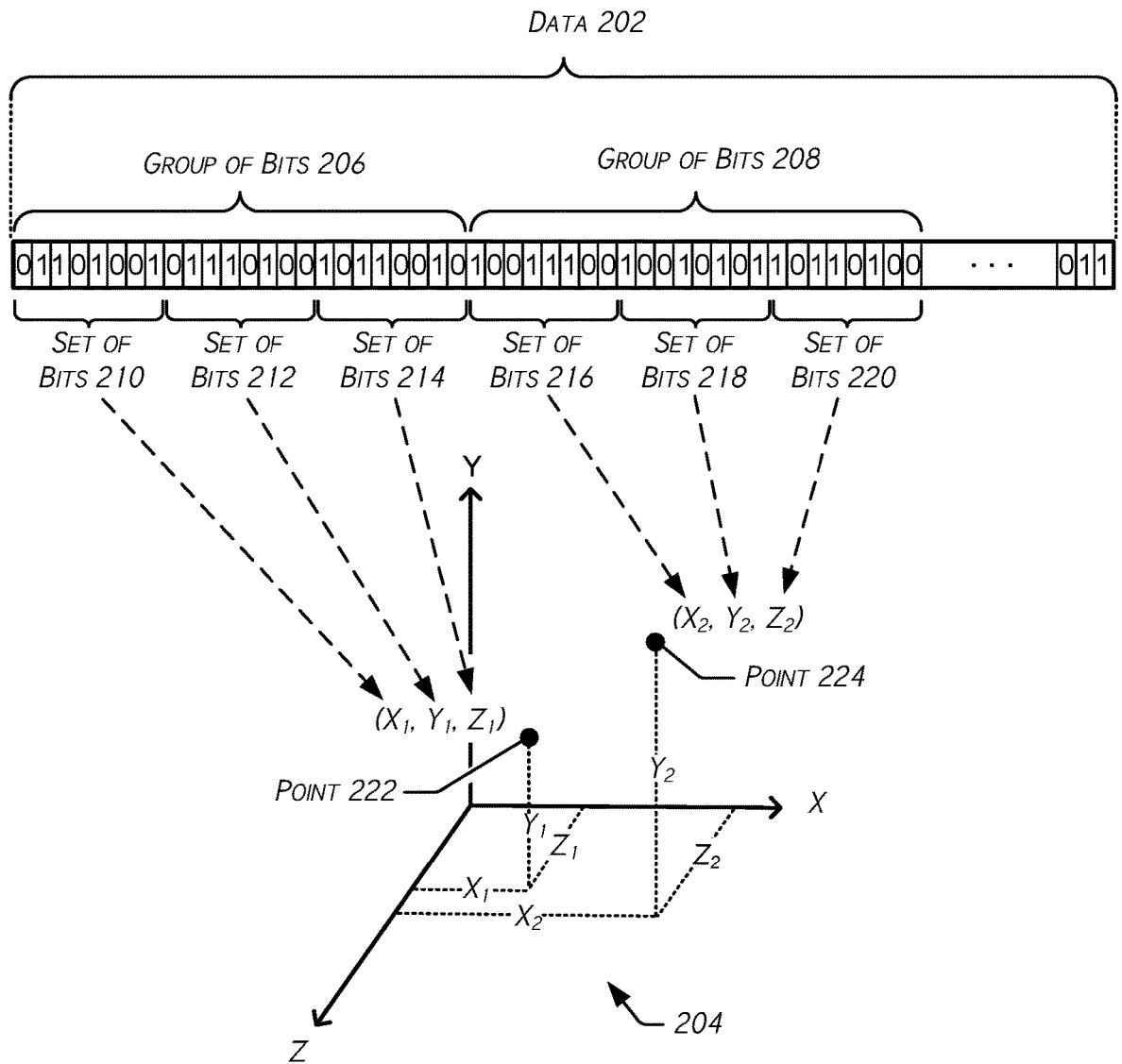
FIG. 2 illustrates an example process of converting data to an n-dimensional point representation in accordance with one or more embodiments.

FIG. 2 illustrates an example process of converting data to an n-dimensional point representation in accordance with one or more embodiments. In this example, control circuitry, such as the control circuitry 111 from FIG. 1, may processes data 202 at a bit/byte level to generate an n-dimensional point representation for the data 202. In particular, the control circuitry processes the data 202 in groups of bits, with each group of bits being converted to coordinates for a point. For example, the control circuitry may identify a first group of bits 206 that includes three bytes of data, with each byte of data corresponding to a set of bits. As shown, the group of bits 206 includes a set of bits 210 (i.e., a first byte), a set of bits 212 (i.e. a second byte), and a set of bits 214 (i.e., a third byte). The set of bits 210 are directly adjacent to the set of bits 212 and the set of bits 212 are directly adjacent to the set of bits 214. In this example, the control circuitry converts the set of bits 210 to an x-coordinate value (illustrated as "$X_1$"), the set of bits 212 to a y-coordinate value (illustrated as "$Y_1$"), and the set of bits 214 to a z-coordinate value (illustrated as "$Z_1$"). The control circuitry may use the coordinate values to produce a point 222 within a coordinate system 204 (e.g., position the point 222), as shown.

Similarly, the control circuitry may identify a second group of bits 208 that includes three bytes of data, with each byte of data corresponding to a set of bits. As shown, the group of bits 208 includes a set of bits 216 (i.e., a first byte), a set of bits 218 (i.e. a second byte), and a set of bits 220 (i.e., a third byte). The set of bits 216 are directly adjacent to the set of bits 218 and the set of bits 218 are directly adjacent to the set of bits 220. In this example, the control circuitry may convert the set of bits 216 to an x-coordinate value (illustrated as "$X_2$"), the set of bits 218 to a y-coordinate value (illustrated as "$Y_2$"), and the set of bits 220 to a z-coordinate value (illustrated as "$Z_2$"). The control circuitry may use the coordinate values to create a point 224 within the coordinate system 204, as shown. The control circuitry can proceed to process any number of bits (e.g., groups of bits) in the data 202 in a similar fashion to produce any number of points within the coordinate system 204.

For ease of illustration, the n-dimensional representation of FIG. 2 is illustrated with two points; however, the n-dimensional representation may include any number of points, such as hundreds or thousands of points. Further, although the n-dimensional representation of FIG. 2 is illustrated with points, as noted above an n-dimensional representation may include other representations.

In the example of FIG. 2, the data 202 represents a unit of data, such as a file, network traffic unit, etc. In many examples, the control circuitry may perform a similar process for any number of units of data (e.g., any number of files) to generate any number of n-dimensional representations. Although the example of FIG. 2 is illustrated in the context of three bytes representing a group of bits and one byte representing a set of bits, a group of bits and/or a set of bits may include any number of bits or bytes. To illustrate, a group of bits may include two bytes of data (or an arbitrary number of bits, such as ten bits), with each byte (or set of five bits) being converted to a coordinate for a two-dimensional coordinate system. Moreover, in some examples control circuitry may process data in other manners, such as by converting the first 200 bytes of data to x-coordinates, the second 200 bytes of data to y-coordinates, and the third 200 bytes of data to z-coordinates. Furthermore, control circuitry may process data in a variety of other manners.

FIGS. 3, 4, 5, 6A-6B, 7, and 8 illustrate example processes 300, 400, 500, 600, 700, and 800 respectively, in accordance with one or more embodiments. For ease of illustration, processes 300, 400, 500, 600, 700, and 800 may be described as being performed in the example architecture 100 of FIG. 1. For example, one or more of the individual operations of the processes 300, 400, 500, 600, 700, and 800 may be performed by the control circuitry 111. However, the processes 300, 400, 500, 600, 700, and/or 800 may be performed in other architectures. Moreover, the architecture 100 may be used to perform other processes.

The processes 300, 400, 500, 600, 700, and 800 (as well as each process described herein) are each illustrated as a logical flow graph, each graph of which represents a sequence of operations that can be implemented in hardware, software, or a combination thereof. In the context of software, the operations represent executable instructions stored on one or more computer-readable media that, when executed by control circuitry, perform the recited operations. Generally, executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

Figure 3:
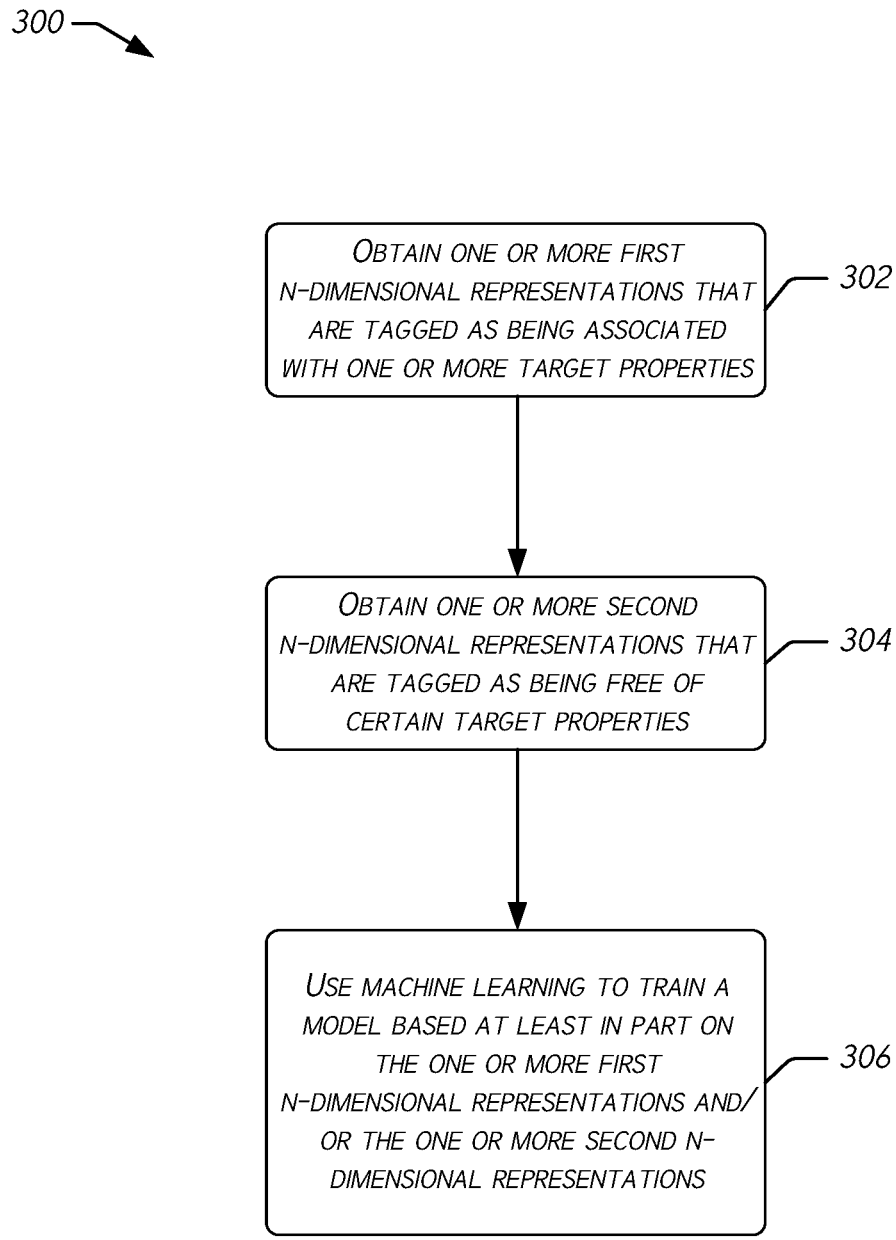
FIG. 3 illustrates an example process to train an analysis model in accordance with one or more embodiments.

FIG. 3 illustrates the example process 300 to train an analysis model in accordance with one or more embodiments.

At 302, one or more first n-dimensional representations that are tagged as being associated with one or more target properties (e.g., threats) may be obtained. For example, the control circuitry 111 can receive training data (e.g., one or more n-dimensional representations) that has been tagged as being associated with malware. The training data may have been tagged by a user, a system, or another entity. In some embodiments where the training data includes one or more n-dimensional representations, the one or more n-dimensional representations may have been generated by the control circuitry 111 by processing data at a bit or byte level, similar to various processes described herein.

At 304, one or more second n-dimensional representations that are tagged as being free of certain target properties may be obtained. For example, the control circuitry 111 may retrieve training data (e.g., one or more n-dimensional representations) that has been tagged as being free of malicious data (e.g., not associated with malware). The training data may have been tagged by a user, a system, or another entity. In some embodiments where the training data includes one or more n-dimensional representations, the one or more n-dimensional representations may have been generated by the control circuitry 111 by processing data at a bit or byte level, similar to various processes described herein.

At 306, machine learning can be used to train a model based at least in part on the one or more first n-dimensional representations and/or the one or more second n-dimensional representations. For example, the control circuitry 111 may analyze training data that is tagged as being associated with malware and/or the training data that is tagged as being malware free and learn what information (e.g., features) are associate with malware/malicious data. By performing the training, the control circuitry 111 may create a machine-trained model that is configured to detect threats/malicious data, identify types of threats/malicious data, identify sources of threats/malicious data, identify a portion(s) of data this is associated with threats/malicious data (e.g., a portion of data to analyze), and so on.

Figure 4:
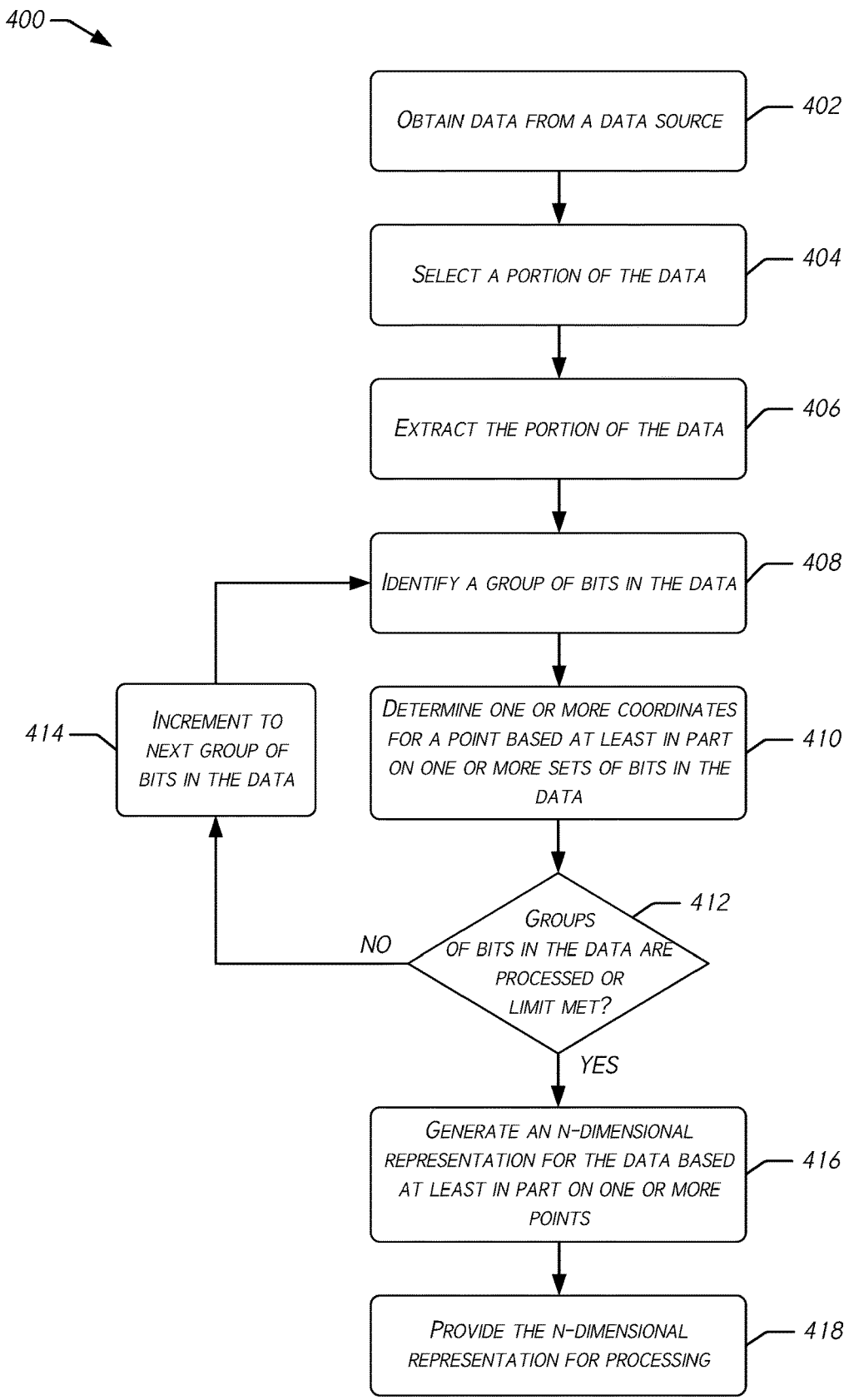
FIG. 4 illustrates an example process to produce one or more n-dimensional representations in accordance with one or more embodiments.

FIG. 4 illustrates the example process 400 to produce one or more n-dimensional representations in accordance with one or more embodiments.

At 402, data can be obtained from a data source. For example, the control circuitry 111 can receive or retrieve data from another device/system/component. The data can comprise a variety of types of data, such as file system data, non-image-based data, network traffic data, runtime data, data associated with an isolated environment, or any other data.

At 404, a portion of the data can be selected. For example, the control circuitry 111 can select a particular portion of the data, such as a particular number of bits/bytes. In some instances, the selection is based on a type of the data (e.g., a format of the data, a use of the data, an environment in which the data is stored or used, a device that generated the data, a size of the data, an age of the data, and so on), entropy data for the data indicating a randomness of one or more portions of the data, and so on.

At 406, the selected portion of the data may be extracted. For example, the control circuitry 111 may extract a first portion of the data, such as a first predetermined number of bytes of the data, and/or refrain from extracting a second portion of the data. As such, the control circuitry 111 may determine to represent the data with a particular portion of the data.

Although the operations 404 and 406 are illustrated as part of the example process 400, in some embodiments the operations 404 and/or 406 (as well as any other operation) may not be performed.

At 408, a group of bits in the data may be identified. For example, the control circuitry 111 may identify three bytes in the data as representing a group of bits. In some embodiments when a portion of the data has been extracted at the operation 406, the control circuitry 111 may initially identify a group of bits at a start of the portion of the data.

At 410, one or more coordinates for a point may be determined based at least in part on one or more sets of bits in the data. For example, the control circuitry 111 may determine a first coordinate for a point based at least in part on a first set of bits in a group of bits, a second coordinate for the point based at least in part on a second set of bits in the group of bits, a third coordinate for the point based at least in part on third set of bits in the group of bits, and so on. In some embodiments, the first set of bits comprises a first byte, the second set of bits comprises a second byte that is directly adjacent to the first byte, and/or the third set of bits comprises a third byte that is directly adjacent to the second byte. However, the sets of bits may not be directly adjacent to each other. As such, the control circuitry 111 may represent a set of bits as a coordinate for a point.

At 412, it may be determined if groups of bits in the data (e.g., all groups) are processed or a limit is met. For example, if the control circuitry 111 has extracted a portion of the data for processing, such as a header of a file, the control circuitry 111 may determine if another group of bits exists in the portion of the data (e.g., if there exists another group of bits that has not yet been converted to a point). That is, the control circuitry 111 may determine if it has reached an end of the data (or portion of the data). Additionally, or alternatively, if a limit is set so that the control circuitry 111 is configured to process a particular/selected number of bits or bytes (e.g., the first 1500 bytes of data), the control circuitry 111 may determine if the limit is reached (e.g., the control circuitry 111 has processed the first 1500 bytes of data).

If the groups of bits in the data that are designated to be processed are processed and/or the limit is reached, the process 400 may proceed to operation 416 (i.e., the "YES" branch). Alternatively, if the groups of bits in the data that are designated to be processed are not processed yet and/or the limit is not reached, the process 400 may proceed to operation 414 (i.e., the "NO" branch).

At 414, a next group of bits in the data may be designated for processing. For example, the control circuitry 111 may increment to a next group of bits in the data, and then proceed to the operation 408 to identify the next group of bits in the data and to the operation 410 to determine one or more coordinates for the next group of bits. The process 400 may loop through operations 414, 408, 410, and 412 any number of times, if needed, to process the data.

At 416, an n-dimensional representation for the data may be generated based at least in part on one or more points. For example, the control circuitry 111 may use one or more coordinates for each point to generate an n-dimensional representation for the data (or selected portion of the data). The n-dimensional representation may include an n-dimensional point representation (e.g., a plurality of points), an n-dimensional model representation (e.g., mesh, wireframe), an n-dimensional map, and so on.

At 418, the n-dimensional representation may be provided for processing. For example, a component of a device/system may provide the n-dimensional representation to another component of the device/system for processing with an analysis model. The control circuitry 111 may cause the n-dimensional representation to be processed with an analysis model that is configured to detect a threat.

In some embodiments, data includes multiple pieces of data (e.g., multiple files) and the process 400 is performed for each piece of data. Further, in some embodiments, the process 400 is performed multiple times for the same data to generate different types of n-dimensional representations for the data.

Figure 5:
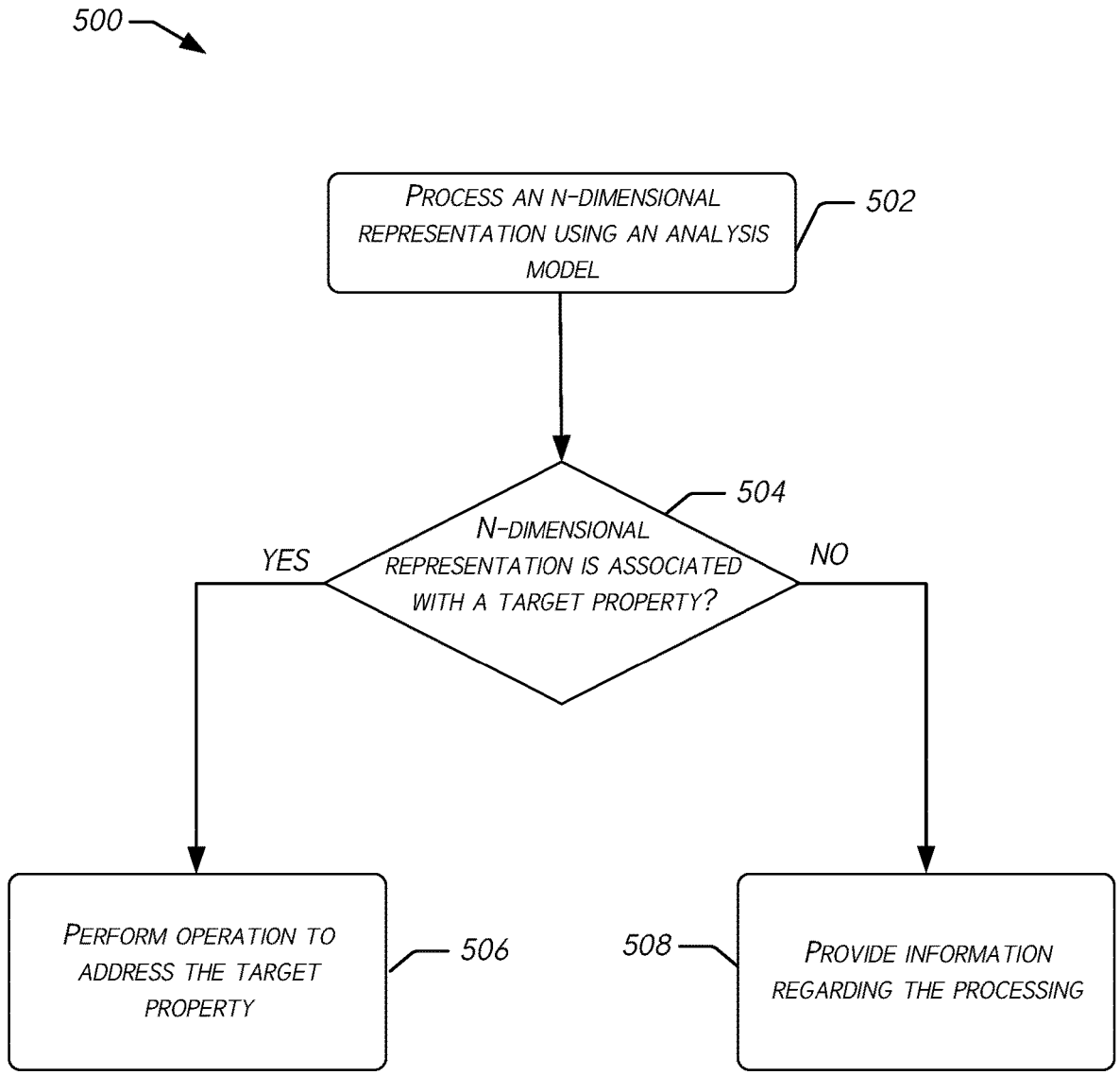
FIG. 5 illustrates an example process to process an n-dimensional representation using an analysis model in accordance with one or more embodiments.

FIG. 5 illustrates the example process 500 to process an n-dimensional representation using an analysis model in accordance with one or more embodiments.

At 502, an n-dimensional representation may be processed using an analysis model. For example, the control circuitry 111 may process an n-dimensional representation using a machine-trained model (e.g., an artificial neural network), a shape comparison model, and/or another model (e.g., a human-trained model). In some examples, the control circuitry 111 may seek to identify information or features within the n-dimensional representation that are associated with one or more threats. Further, in some examples, the control circuitry 111 may compare the n-dimensional representation to n-dimensional representations associated with threats. In many instances, the control circuitry 111 may determine a confidence value/data indicating a likelihood that the n-dimensional representation is associated with a threat. In some embodiments, the control circuitry 111 may process the n-dimensional representation multiple times using different models and/or process various n-dimensional representations within a coordinate system.

At 504, it may be determined if the n-dimensional representation is associated with a target property. For example, the control circuitry 111 may determine if a confidence value/data regarding a threat is greater than a threshold.

If the n-dimensional representation is associated with a target property, the process 500 may proceed to operation 506 (i.e., the "YES" branch). Alternatively, if the n-dimensional representation is not associated with any target properties, the process 500 may proceed to operation 508 (i.e., the "NO" branch).

At 506, an operation may be performed to address the target property. For example, the control circuitry 111 may perform or cause to be performed a threat operation that includes removing a threat, replacing a threat (e.g., malicious data), preventing a threat from associating with data, providing information (e.g., a notification, a report, a malware rating indicating a likelihood that the data is associated with malware, etc.) to a client device regarding the threat, and so on.

At 508, information may be provided regarding the processing. For example, the control circuitry can provide information indicating that no threats are associated with the n-dimensional representation, information indicating a confidence value for the processing, and so on. The information can be provided in a report, notification, message, signal, etc. to a client device and/or another system/component. In some instances, the operation 508 is additionally, or alternatively, performed in the branch for operation 506 (e.g., to provide information regarding a detected threat).

Figure 6A:
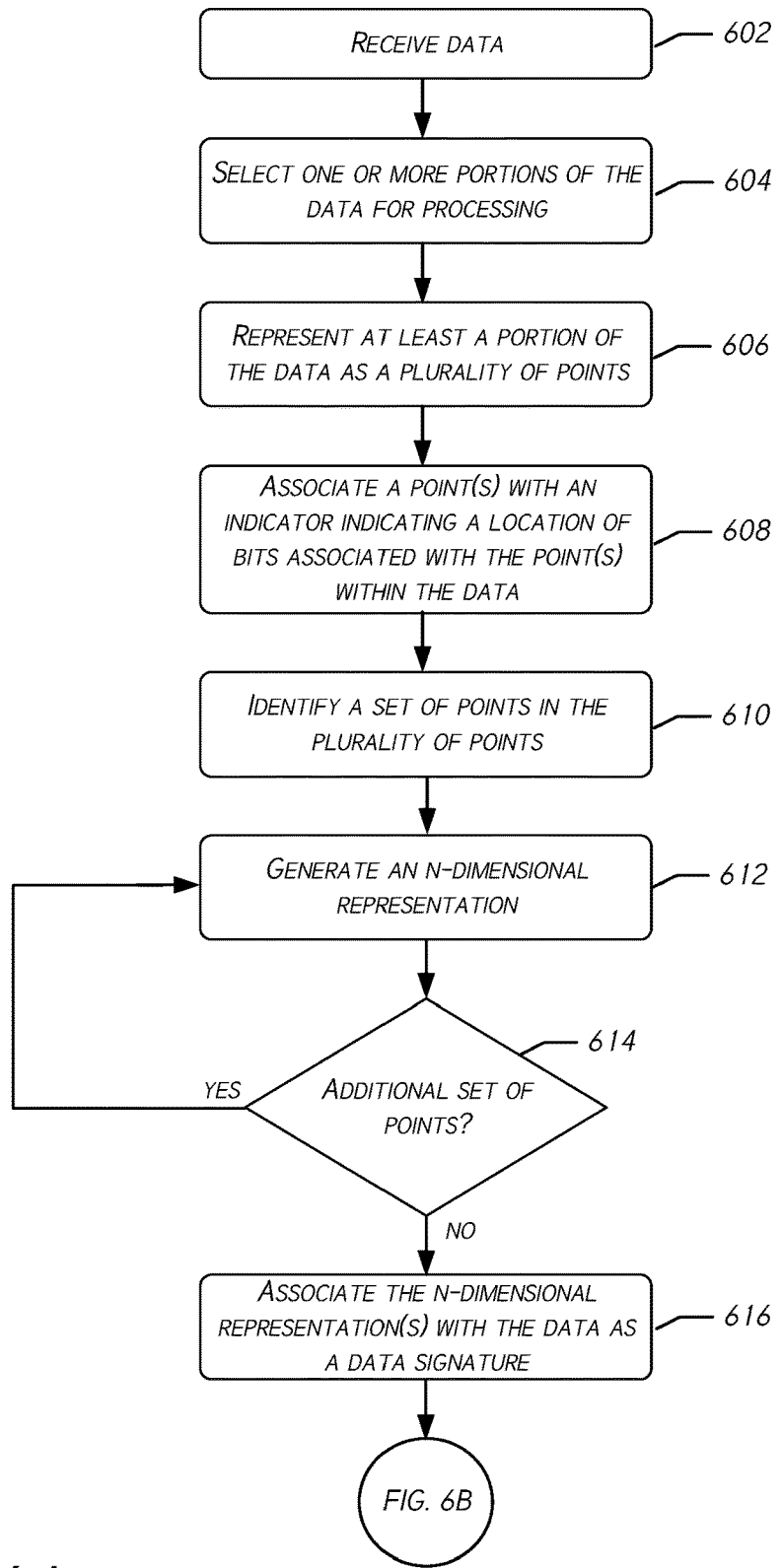
FIGS. 6A-6B illustrates an example process to generate one or more n-dimensional representations and analyze the one or more n-dimensional representations in accordance with one or more embodiments.
Figure 6B:
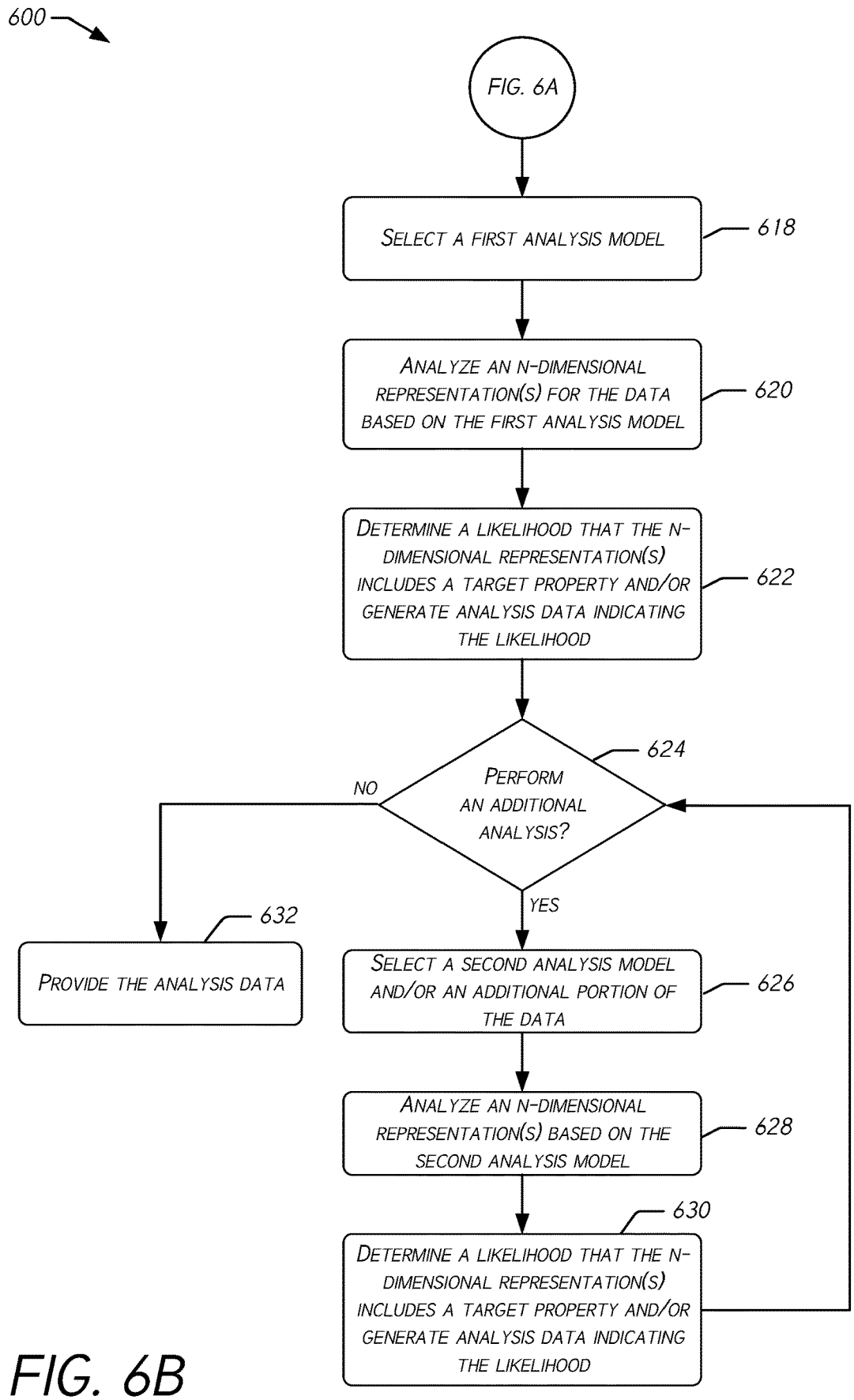

FIGS. 6A-6B illustrates the example process 600 to generate one or more n-dimensional representations and analyze the one or more n-dimensional representations in accordance with one or more embodiments.

In FIG. 6A, at 602, data can be received. For example, the control circuitry 111 can receive data from another device, system, component, and so on. In some instances, the data is retrieved from a data store, such as a data store associated with the control circuitry 111 and/or another system.

At 604, one or more portions of the data can be selected for processing. For example, the control circuitry 111 can select a particular number of bits/bytes of the data at a particular location within the data. In some instances, the selection is based on a type of the data (e.g., a format of the data, a use of the data, an environment in which the data is stored or used, a device that generated the data, a size of the data, an age of the data, and so on), entropy data for the data indicating a randomness of one or more portions of the data, and so on. To illustrate, the control circuitry 111 can analyze the data the data using an entropy algorithm to generate entropy data indicating a randomness of one or more portions of the data. Based on the entropy data, the control circuitry 111 can select a particular portion of the data for processing, such as a portion that is associated with a most/least amount of randomness, a portion that is associated with a randomness value that is above/below a threshold, and so on.

At 606, at least a portion of the data can be represented as a plurality of points. For example, the control circuitry 111 can represent a portion of the data that is selected at 604 as a plurality of points within a coordinate system/space. To illustrate, the control circuitry 111 can represent a first set of bits in the data as a first coordinate for a first point and a second set of bits in the data as a second coordinate for the first point. The second set of bits can be adjacent to the first set of bits (e.g., directly adjacent or within a particular number of bits). Similarly, the control circuitry 111 can represent a third set of bits in the data as a first coordinate for a second point and a fourth set of bits in the data as a second coordinate for the second point. The fourth set of bits can be adjacent to the third set of bits.

At 608, one or more points can be associated with an indicator indicating a location of bits associated with the one or more points within the data. For example, the control circuitry 111 can determine a location of bits (associated with a point) within the data and associate a location indicator with the point. In some instances, the location indicator can be visually represented within a coordinate space and/or used to generate a visual representation for a surface of a model, such as a color, contrast, brightness, and so on. This can allow a user to view a location of a point and/or a location of surfaces/points for a model associated with the point. To illustrate, one or more of the plurality of points within the coordinate system can be associated with a color, wherein each color can be associated with a different section within the data (e.g., a header, a body, a footer, and so on). A user may be able to view the coloring of the plurality of points to identify where the points are located within the data. In other instances, the location indicator may not be visually represented and/or may be used by a system/component and another manner.

At 610, a set of points in the plurality of points can be identified. For example, the control circuitry 111 can analyze the plurality of points using a pattern recognition algorithm to identify points that are within a particular distance from each other, positioned on a virtual surface/plane (e.g., aligned to form a substantially planar surface), and/or otherwise include characteristics that may indicate that the set of points are positioned within some type of pattern that may be used to form a surface/edge.

At 612, an n-dimensional representation can be generated. In some examples, the control circuitry 111 can generate an n-dimensional representation for the set of points that are identified at 610. Alternatively, or additionally, the control circuitry 111 can generate an n-dimensional representation for any number of points within the plurality of points, such as all points within the plurality of points, a predetermined number of points within the plurality of points, and so on. An n-dimensional representation can include an n-dimensional point representation (e.g., the plurality of points), an n-dimensional model representation (e.g., a mesh model, a wireframe model, etc.), an n-dimensional map, and so on. An n-dimensional representation can have any number of dimensions, such as two, three, four, five, etc. As noted above, each dimension of a representation can refer to a characteristic/input of data. For instance, a five-dimensional representation for data can include three dimensions that represent a 3D model within a 3D space and one dimension that represents a type of the data (e.g., network traffic, file system data, etc.) and another dimension that represents metadata associated with the data.

At 614, it may be determined if an additional set of points are included within the data. For example, the control circuitry 111 can perform an additional analysis on the plurality of points (points other than the first set of points) using a pattern recognition algorithm to determine if there is an additional set of points associated with particular characteristics (e.g., a particular pattern).

If an additional set of points is not included within the data, the process 600 may proceed to operation 616 (i.e., the "NO" branch). Alternatively, if an additional set of points is included within the data, the process 600 may return to operation 612 (i.e., the "YES" branch) to generate an n-dimensional representation for the additional set of points. The process 600 may perform operations 614 and 612 any number of times to generate any number of n-dimensional representations for the plurality of points in the coordinate space (e.g., generate any number of models for the plurality of points).

At 616, the one or more n-dimensional representations can be associated with the data as a data signature. For example, the control circuitry 111 can generate a data signature for the data and associate any number of an-n-dimensional representations that have been generated for the data (e.g., any number of models that are generated for the plurality of points within the coordinate space).

In FIG. 6B, at 618, a first analysis model can be selected. For example, the control circuitry 111 can select a first analysis model based on a type of the data, where the portion of the data selected at 604 is located within the data, entropy data indicating a randomness of at least a portion of the data (e.g., the data as a whole, the portion of the data selected at 604 for processing, etc.), and so on.

At 620, one or more n-dimensional representations for the data can be analyzed based on the first analysis model. For example, the control circuitry 111 can use the first analysis model to analyze one or more n-dimensional representations associated with the plurality of points for the coordinate space. In one illustration, the control circuitry 111 can compare a 2D or 3D model representing one or more portions of the data to one or more 2D or 3D models that are tagged/classified as being associated with a certain target property (e.g., malicious data). The control circuitry 111 can determine a similarity between the 2D/3D data model and the 2D/3D malicious data model. In another illustration, the control circuitry 111 can use a machine-trained model to (i) analyze/determine one or more characteristics/features of an n-dimensional representation (e.g., a point representation, a model representation, a map representation etc.) and/or (ii) determine if those one or more characteristics/features are associated with a target property.

At 622, a likelihood that the one or more n-dimensional representations include a target property can be determined and/or analysis data can be generated indicating the likelihood. For example, the control circuitry 111 can determine a likelihood that an n-dimensional representation includes malicious data based on the analysis at 620. The control circuitry 111 can generate analysis data indicating the likelihood, such as a confidence value/data. As noted above, a target property can refer to/include malicious behavior (e.g., malicious data intended to damage an environment/system/ device), benign behavior (e.g., data/behavior that is not malicious), a vulnerability (e.g., vulnerability data that may make an environment/system/device vulnerable to an attack), or any other security-related characteristic.

The operation 620 and/or the operation 622 can be based on one or more characteristics of one or more n-dimensional representations within the coordinate system. For example, the control circuitry 111 can determine a shape of a model(s) within the coordinate system, a size of a model(s), a volume of a model(s), an area of a model(s), a number of surfaces of a model(s), a location of a model(s) within the coordinate system, a position of a model relative to another model within the coordinate system, a number of models generated for the coordinate system, a location indicator for a point, an amount or location of empty space within a coordinate system, and so on.

At 624, it may be determined if an additional analysis should be performed. In some examples, the control circuitry 111 can determine if a confidence value that the one or more in-dimensional representations include a target property (e.g., associated with/indicating a threat, disruption, nuisance, etc.) is within a range of values, is greater than a threshold, is less than a threshold, or otherwise satisfies one or more criteria. Further, in some examples, the control circuitry 111 can process the data a predetermined number of times, and the control circuitry 111 can determine if the predetermined number of times has been reached.

If it is determined to perform an additional analysis, the process 600 may proceed to operation 626 (i.e., the "YES" branch). Alternatively, if it is determined to not perform an additional analysis, the process 600 may proceed to operation 632 (i.e., the "NO" branch).

At 626, a second analysis model and/or an additional portion of the data can be selected. For example, the control circuitry 111 can select a second analysis model based on a type of the data, where the portion of the data selected at 604 is located within the data, entropy data indicating a randomness of at least a portion of the data (e.g., the data as a whole, the portion of the data selected at 604 for processing, etc.), a confidence value generated from a previous analysis, a type of the first analysis model, and so on. In some instances, the second analysis model is different than the first analysis model. However, the second analysis model can be the same. Further, the control circuitry 111 can select a different portion of the data (also referred to as "the second portion of the data") for analysis at operation 628.

At 628, one or more n-dimensional representations for the data can be analyzed. In some examples, the control circuitry 111 can use the second analysis model to analyze one or more previously generated n-dimensional representations (e.g., a second time). Further, in some examples, the control circuitry 111 can generate one or more n-dimensional representations for the second portion of the data (in a similar fashion as that discussed for one or more of operations 604-616) and use the second analysis model to analyze the one or more n-dimensional representations.

At 630, a likelihood that the one or more n-dimensional representations include a target property can be determined and/or analysis data can be generated indicating the likelihood. For example, the control circuitry 111 can determine, based on the analysis at 628, a likelihood that an n-dimensional representation includes malicious data (e.g., malware, such as a virus, spyware, ransomware, polymorphic malware, etc.). The control circuitry 111 can generate analysis data indicating the likelihood, such as a confidence value/data.

The control circuitry 111 can perform the operations 628 and 630 in a similar fashion as that discussed above in reference to operations 620 and 622, respectively (e.g., based on one or more characteristics of one or more n-dimensional representations within the coordinate system).

The control circuitry 111 can perform the operations 626, 628, and/or 630 any number of times to analyze one or more portions of the data. For example, although the process 600 refers to a second analysis model at operations 626 and 628, the process 600 can implement a third analysis model and/or a third portion of the data (when the operations 626, 628, and/or 630 are performed a second time), a fourth analysis model and/or a fourth portion of the data (when the operations 626, 628, and/or 630 are performed a third time), and so on.

In some instances, the control circuitry 111 implements a multilayered approach, wherein each iteration (also referred to as a "layer") through the operations 626, 628, and 630 processes the data with a different analysis model that includes different characteristics, such as a model that uses different computational resources, requires different amounts of computational time, provides different levels of effectiveness, provides different types of confidence values (e.g., a first model that is configured to minimize false positives, a second model that is configured to minimize false negatives, etc.), and so on. To illustrate, each iteration through the operation 628 can process data with an analysis model that requires more computational resources (in comparison to a previously implemented analysis model), requires more computational time, provides more accurate results, and so on. In one example, an additional analysis model (e.g., second, third, fourth, etc. model) includes a machine-trained model, such as a neural network. However, each iteration through the operation 628 can process data with any type of analysis model.

Further, in some instances, a multilayered approach can include selecting a larger portion (or smaller, in some cases) of the data and/or a different portion of the data with each iteration through the operations 626, 628, and 630. In one illustration, at operation 620, a first portion of the data can be analyzed using an analysis model, wherein the first portion includes less than a threshold amount of bits/bytes and/or is associated with a particular portion/section of the data. If it is determined (at 624, for example) that the confidence value for this initial analysis is above a first threshold, and/or the confidence value is below a second threshold, the operations 626, 628, and 630 can be performed for a second portion of the data using the same analysis model and/or an additional analysis model. This second portion of the data can include more bits/bytes than the first portion of the data and/or include a different section of the data than the first portion. In another illustration, the operations 626, 628, and/or 630 can be performed for a shifted set of bits/bytes. Here, at operations 620 and 622, a first set of bits of the data can be processed. Then, at operation 626, a second set of bits can be selected, wherein the second set of bits can include a group of bits that overlap with the first set of bits, such as a predetermined number of bits/bytes. Operations 628 and 630 can be performed for the second set of bits. In some instances, processing a larger (or different) portion of the data can require more computational resources, require more computational time, provide more accurate results, and so on.

In some examples, composite analysis data can be generated based on multiple analyses of the data. For instance, a first confidence value can be generated based on an analysis of the data a first time (e.g., at operations 620 and 622) and a second confidence value can be generated based on an analysis of the data a second time (e.g., at operations 628 and 630). The first/second confidence value can indicate a likelihood that the data includes malicious data. A composite confidence value can then be generated based on the first confidence value and the second confidence value, such as by using an equation/algorithm (which can include applying a weighting to a confidence value(s), such as by weighting the second (or first) confidence value higher), and so on.

At 632, the analysis data can be provided. For example, the control circuitry 111 can provide the analysis data generated at 622 and/or 630 to a device, system, and/or component. In some instances, the analysis data is provided as interface data, which can be output (e.g., displayed) via a user interface. Further, in some instances, the analysis data is provided as a message or signal, which can cause additional processing to be performed, such as removing/replacing a threat (e.g., malicious data), preventing a threat from associating with data, providing information, and so on.

Figure 7:
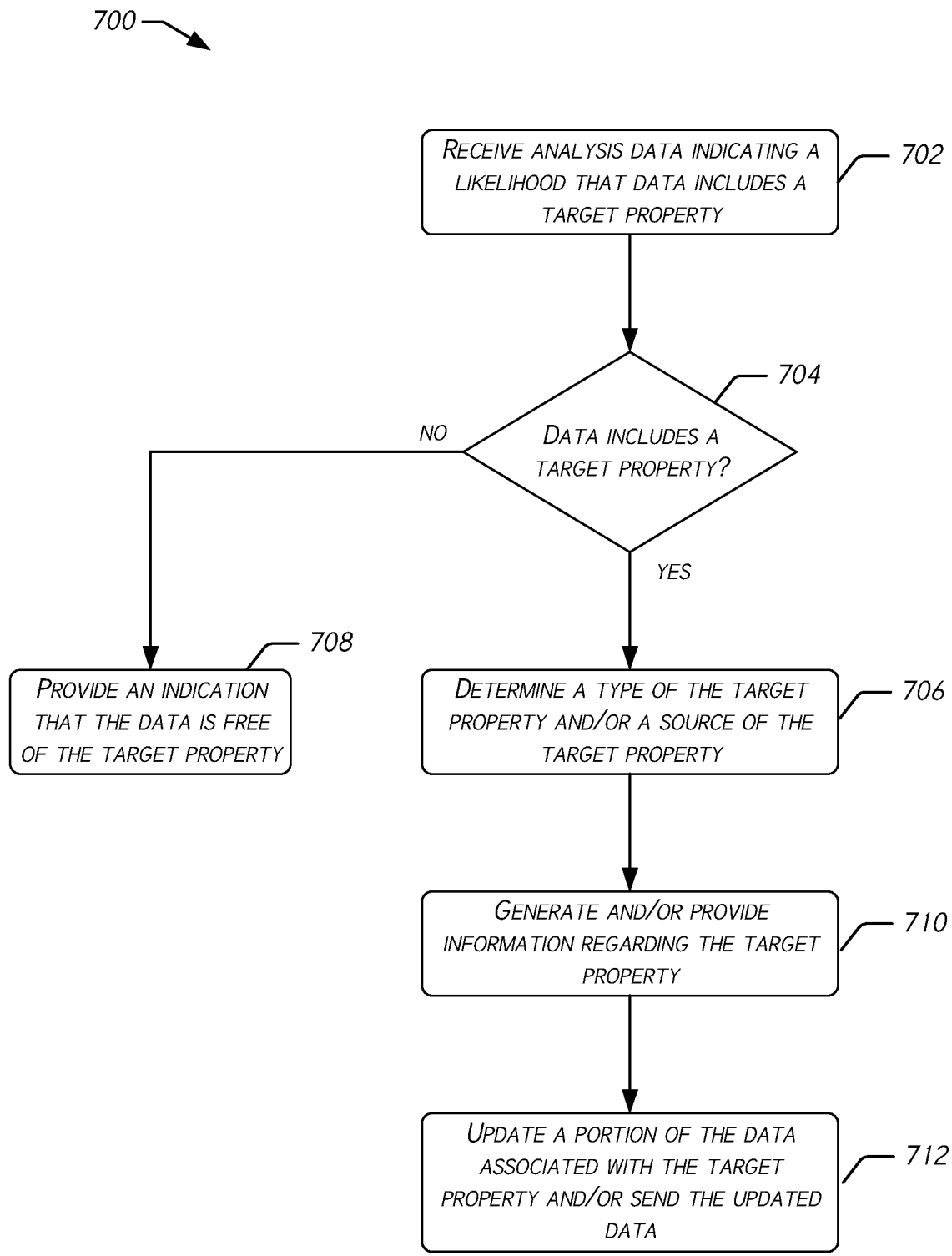
FIG. 7 illustrates an example process to process analysis data regarding a target property and determine one or more characteristics about the target property in accordance with one or more embodiments.

FIG. 7 illustrates the example process 700 to process analysis data regarding a target property and determine one or more characteristics about the threat in accordance with one or more embodiments.

At 702, analysis data indicating a likelihood that data includes a target property can be received. For example, the control circuitry 111 can obtain/retrieve analysis data regarding an analysis of data using one or more of the techniques discussed herein and/or other techniques.

At 704, it may be determined if the data includes a target property. For example, the control circuitry 111 can determine if a confidence value/data included in or otherwise associated with the analysis data is greater than a threshold or otherwise satisfies one or more criteria. The confidence value can indicate a likelihood that one or more n-dimensional representations include a target property. The confidence value can be generated by an analysis model when processing the one or more n-dimensional representations.

If it is determined that the data includes a target property, the process 700 may proceed to operation 706 (i.e., the "YES" branch). Alternatively, if it is determined that the data does not include a target property, the process 700 may proceed to operation 708 (i.e., the "NO" branch).

At 708, an indication can be provided that the data is free of the target property. For example, the control circuitry 111 can generate information/signal/message indicating that the data is free of the target property. The control circuitry 111 can provide the information/signal/message to a system/device/component, which can use the information/signal/message in a variety of manners (including continuing with normal processing).

At 706, a type of the target property and/or a source of the target property can be determined. For example, the control circuitry 111 or other control circuitry can determine through machine learning or other techniques one or more characteristics of an n-dimensional representation and/or coordinate system that are generally associated with particular types of target properties (e.g., threats) and/or sources of target properties (e.g., particular entities that create threats, particular entities that distribute threats, and so on). The control circuitry 111 can determine a similarity between one or more malicious data characteristics and one or more characteristics of an n-dimensional representation to determine a type of the target property and/or a source of the target property. For instance, the control circuitry 111 can determine a type of malicious data and/or a source of the malicious data based on a shape of an n-dimensional representation(s) (e.g., 2D/3D model, point cloud, n-dimensional map, etc.), a size of the n-dimensional representation(s), a volume of the n-dimensional representation, an area of the n-dimensional representation(s), a number of surfaces of the n-dimensional representation(s), a location of the n-dimensional representation(s) within a coordinate system, a position of the n-dimensional representation(s) within the coordinate system relative to another n-dimensional representation(s) (e.g., how close n-dimensional representations are to each other, a cluster of n-dimensional representations, etc.), a number of n-dimensional representations within the coordinate system that are associated with malicious data, a number of n-dimensional representations within the coordinate system (whether or not they are associated with malicious data), where data that is associated with a threat is located within a piece of data (e.g., where data used to generate a malicious model is located within a file or other data unit), an amount or location of empty space within a coordinate system, and so on.

At 710, information regarding the target property can be generated and/or provided. For example, the control circuitry 111 can generate information indicating the type of threat and/or the source of the threat. The control circuitry 111 can provide the information to a system/device/component, such as by providing user interface data, a message/signal, and so on.

At 712, a portion of the data associated with the target property can be updated and/or the updated data can be sent to a component/system/device. For example, the control circuitry 111 can determine that a threat is associated with a particular location in data (e.g., the threat is located at within a header/footer/body, the threat is located within the first 1500 bytes/bits, the threat is located at bytes/bits 2500-3500, the threat is associated with a macro associated with a file, and so on). The control circuitry 111 can update a portion of the data that includes the threat, such as by removing the malicious data from the data, replacing the malicious data (e.g., with different data), and so on. Further, in some instances, the data can be associated with a notification/signal indicating that the data is associated with a target property, wherein such notification can be displayed or otherwise provided when the data (or a specific portion of the data that is associated with a threat) is presented, such as when the data is presented to a user. In one illustration, the control circuitry 111 can receive network data and process the network data to determine if the data is associated with a threat. If the data is associated with a threat, the control circuitry 111 can update the portion of the data in substantially real-time as the data is received, so that the data can be transmitted without a threat. This can allow a network transmission of the data to continue without interruption.

Figure 8:
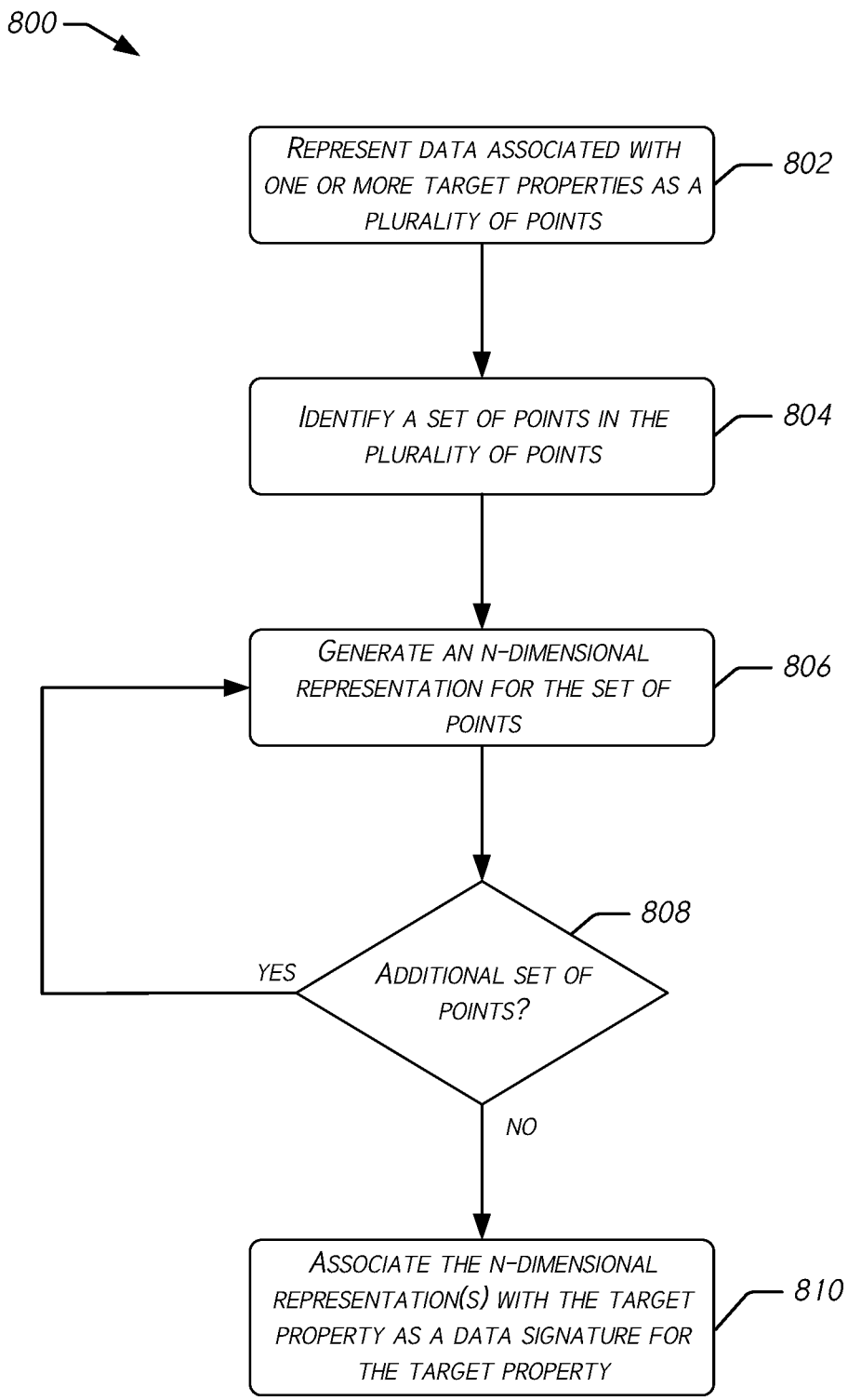
FIG. 8 illustrates an example process to generate one or more n-dimensional representations for data associated with one or more target properties in accordance with one or more embodiments.

FIG. 8 illustrates the example process 800 to generate one or more n-dimensional representations for data associated with one or more target properties in accordance with one or more embodiments.

At 802, data that is associated with one or more target properties can be represented as a plurality of points. The data may have been previously tagged or otherwise categorized as including the one or more target properties (e.g., malicious data). For example, the control circuitry 111 can represent malicious data as a plurality of points within a coordinate system/space. To illustrate, the control circuitry 111 can represent a first set of bits in the malicious data as a first coordinate for a first point and a second set of bits in the malicious data as a second coordinate for the first point. The second set of bits can be adjacent to the first set of bits (e.g., directly adjacent or within a particular number of bits). Similarly, the control circuitry 111 can represent a third set of bits in the malicious data as a first coordinate for a second point and a fourth set of bits in the malicious data as a second coordinate for the second point. The fourth set of bits can be adjacent to the third set of bits.

At 804, a set of points in the plurality of points can be identified. For example, the control circuitry 111 can analyze the plurality of points using a pattern recognition algorithm to identify points that are within a particular distance from each other, positioned on a virtual surface/plane (e.g., aligned to form a substantially planar surface), and/or otherwise include characteristics that may indicate that the set of points are positioned within some type of pattern that may be used to form a surface/edge.

At 806, an n-dimensional representation can be generated. In some examples, the control circuitry 111 can generate an n-dimensional representation for the set of points that are identified at 804. Alternatively, or additionally, the control circuitry 111 can generate an n-dimensional representation for any number of points within the plurality of points, such as all points within the plurality of points, a predetermined number of points within the plurality of points, and so on. An n-dimensional representation can include an n-dimensional point representation (e.g., the plurality of points), an n-dimensional model representation (e.g., a mesh model, a wireframe model, etc.), an n-dimensional map, and so on. An n-dimensional representation can have any number of dimensions, such as two, three, four, five, etc.

At 808, it may be determined if an additional set of points are included within the data. For example, the control circuitry 111 can perform an additional analysis on the plurality of points (points other than a first set of points) using a pattern recognition algorithm to determine if there are an additional set of points associated with one or more characteristics (e.g., a pattern).

If an additional set of points is not included within the data, the process 800 may proceed to operation 810 (i.e., the "NO" branch). Alternatively, if an additional set of points is included within the data, the process 800 may return to operation 806 (i.e., the "YES" branch) to generate an n-dimensional representation for the additional set of points. The process 800 may perform operations 806 and 808 any number of times to generate any number of n-dimensional representations for the plurality of points in the coordinate space (e.g., generate any number of models for the plurality of points).

At 810, the one or more n-dimensional representations can be associated with the one or more target properties as a data signature for the one or more target properties. For example, the control circuitry 111 can generate a data signature for a threat and associate any number of n-dimensional representations that have been generated for the data (e.g., any number of models that are generated for the plurality of points within the coordinate space). The data signature can be stored in a data store. As such, a data signature for a target property can be associated with a target property, which can be used to analyze other data to determine if the other data includes a target property.

In some examples, machine learning can be implemented to identify characteristics of n-dimensional representations that are associated with target properties (e.g., threats). For instance, upon generating a first model for a type of malicious data and a second model for the same type of malicious data, a machine learning technique can be implemented to learn a characteristic(s) that is associated with the first model and the second model. Such characteristic can be stored/associated with a threat (e.g., associate a model characteristic with a threat (within a data signature), when the model is generated/identified for the particular type of threat a predetermined number of times).

Further, in some examples, data for various types of malware or other types of target properties can be processed to create a data store for multiple types of threats. For instance, the process 800 can be performed any number of times to create a taxonomy of data signatures for various types of malware.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel and/or at different times.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

It should be appreciated that in the above description of embodiments, various features are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the disclosure should not be limited by the particular embodiments described above.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same, related, or unrelated reference numbers. The relevant features, elements, functions, operations, modules, etc. may be the same or similar functions or may be unrelated.

The term "module" is used in the description of one or more of the embodiments. A module implements one or more functions via a device, such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

Example Clauses

Example A, a system comprising: control circuitry; and memory communicatively coupled to the control circuitry and storing executable instructions that, when executed by the control circuitry, cause the control circuitry to perform operations comprising: receiving data; representing at least a portion of the data as a plurality of points in a coordinate system; using a pattern recognition algorithm to identify a set of points in the plurality of points; generating an n-dimensional model for the set of points; comparing the n-dimensional model to a plurality of n-dimensional models that are tagged as including a target property associated with at least one of malicious behavior, benign behavior, or a vulnerability; and based at least in part on the comparison, determining a likelihood that the data includes the target property.

Example B, the system of Example A, wherein the representing includes: representing a first set of bits in the data as a first coordinate for a first point of the plurality of points and a second set of bits as a second coordinate for the first point, the second set of bits being adjacent to the first set of bits; and representing a third set of bits in the data as a first coordinate for a second point of the plurality of points and a fourth set of bits in the data as a second coordinate for the second point, the fourth set of bits being adjacent to the third set of bits.

Example C, the system of Example A or B, wherein the n-dimensional model includes at least one of a 3D mesh or 3D wireframe.

Example D, the system of any of Examples A-C, wherein the determining the likelihood is based on at least one of a shape of the n-dimensional model, a size of the n-dimensional model, a volume of the n-dimensional model, an area of the n-dimensional model, a number of surfaces of the n-dimensional model, a location of the n-dimensional model within the coordinate system, a position of the n-dimensional model relative to another n-dimensional model within the coordinate system, or a number of n-dimensional models within the coordinate system.

Example E, the system of any of Examples A-D, wherein the operations further comprise: determining that the data includes the target property; and determining at least one of a type of the target property or a source of the target property based on at least one of a shape of the n-dimensional model, a size of the n-dimensional model, a volume of the n-dimensional model, an area of the n-dimensional model, a number of surfaces of the n-dimensional model, a location of the n-dimensional model within the coordinate system, a position of the n-dimensional model to another n-dimensional model within the coordinate system, or a number of n-dimensional models within the coordinate system that are associated with the target property or another target property.

Example F, the system of any of Examples A-E, wherein the operations further comprise: determining that the data includes the target property; updating a portion of the data that includes the target property to generate updated data, the updating including at least one of removing the target property or replacing the target property; and sending the updated data to a component.

Example G, the system of any of Examples A-F, wherein the operations further comprise: representing predetermined data associated with the target property as multiple points; processing the multiple points to generate one or more of the plurality of n-dimensional models that are tagged as associated with the target property; and storing the plurality of n-dimensional models as signatures for the predetermined data.

Example H, a method comprising: receiving, by control circuitry, data; representing, by the control circuitry, at least a portion of the data as a first plurality of points in a coordinate system; analyzing, by the control circuitry, the first plurality of points to identify a set of points; generating, by the control circuitry, a first n-dimensional model for the set of points; and determining, by the control circuitry, a first likelihood that the data includes a target property based at least in part on an analysis of (i) the first n-dimensional model and (ii) a plurality of n-dimensional models that are tagged as being associated with the target property, the target property including at least one of malicious data, benign data, or vulnerability data.

Example I, the method of Example I, wherein the determining the first likelihood includes determining a likelihood that the data includes polymorphic malware.

Example J, the method of Example H or I, further comprising: generating a signature for the data that includes the first n-dimensional model.

Example K, the method of any of Examples H-J, wherein the representing includes: determining a first coordinate for a first point of the plurality of points based at least in part on a first group of bits in the data; and determining a second coordinate for the first point based at least in part on a second groups of bits in the data that is adjacent to the first group of bits.

Example L, the method of any of Examples H-K, further comprising: associating the first point with an indicator indicating a location of at least one of the first group of bits or the second group of bits within the data; wherein the determining the first likelihood is based at least in part on the indicator.

Example M, the method of any of Examples H-L, wherein the portion of the data includes first bits, and the method further comprises: representing second bits in the data as a second plurality of points, the second bits including a group of bits that overlap with the first bits; generating a second n-dimensional model for the second plurality of points; and determining a second likelihood that the data includes the target property based at least in part on an analysis of (i) the second n-dimensional model and (ii) the plurality of n-dimensional models that are tagged as being associated with the target property.

Example N, one or more non-transitory computer-readable media storing computer-executable instructions that, when executed by control circuitry, cause the control circuitry to perform operations comprising: receiving data; representing at least a first portion of the data as a plurality of points in a coordinate system; identifying a set of points in the plurality of points; generating a n-dimensional model for the set of points; comparing the n-dimensional model to a n-dimensional model that is tagged as being associated with a target property; and generating a first confidence value indicating a first likelihood that the data includes the target property.

Example O, the one or more non-transitory computer-readable media of Example N, wherein the operations further comprise: processing the plurality of points using a machine-trained model; generating a second confidence value indicating a second likelihood that the data includes the target property; and determining a composite confidence value for the data based at least in part on the first confidence value and the second confidence value.

Example P, the one or more non-transitory computer-readable media of Example N or O, wherein the first likelihood indicates a likelihood that the data includes malware.

Example Q, the one or more non-transitory computer-readable media of any of Examples N-P, wherein the operations further comprise: analyzing the data to generate entropy data indicating a randomness of the first portion of the data and a randomness of a second portion of the data; and selecting the first portion of the data for processing based at least in part on the randomness of the first portion of the data; wherein the representing the first portion of the data is based at least in part on selecting the first portion of the data.

Example R, the one or more non-transitory computer-readable media of any of Examples N-Q, wherein at least one of the representing, the using, the generating, or the comparing are part of implementing a first analysis model, and the operations further comprise: selecting a second analysis model based on at least one of a type of the data, where the first portion of the data is located within the data, or entropy data indicating a randomness of at least the first portion of the data, the second analysis model being different than the first analysis model; and analyzing the data using the second analysis model.

Example S, the one or more non-transitory computer-readable media of any of Examples N-R, wherein the n-dimensional model includes at least one of a mesh or wireframe.

Example T, the one or more non-transitory computer-readable media of any of Examples N-S, wherein the generating is based on at least one of a shape of the n-dimensional model, a size of the n-dimensional model, a volume of the n-dimensional model, an area of the n-dimensional model, a number of surfaces of the n-dimensional model, a location of the n-dimensional model within the coordinate system, a position of the n-dimensional model relative to another n-dimensional model within the coordinate system, or a number of n-dimensional models within the coordinate system.

Example AA, a method of detecting malware, the method comprising: receiving, by a computing device, data from a data store; identifying, by the computing device, at least a first group of bits in the data and a second group of bits in the data; representing, by the computing device, a first set of bits in the first group of bits as a first coordinate for a first point and a second set of bits in the first group of bits as a second coordinate for the first point; representing, by the computing device, a first set of bits in the second group of bits as a first coordinate for a second point and a second set of bits in the second group of bits as a second coordinate for the second point; generating, by the computing device, an n-dimensional representation for the data based at least in part on the first point and the second point; processing the n-dimensional representation using a model that has been trained using machine learning; and determining a malware rating for the data based at least in part on the processing, the malware rating indicating a likelihood that the data is associated with malware.

Example BB, the method of Example A, further comprising: representing, by the computing device, a third set of bits in the first group of bits as a third coordinate for the first point, wherein the n-dimensional representation comprises a three-dimensional representation.

Example CC, the method of Example A or B, wherein the first set of bits in the first group of bits comprises a first byte, the second set of bits in the first group of bits comprises a second byte that is directly adjacent to the first byte, and the third set of bits in the first group of bits comprises a third byte that is directly adjacent to the second byte.

Example DD, the method of any of Examples A-C, wherein the data comprises file system data.

Example EE, the method of any of Examples A-D, wherein the data comprises non-image-based data.

Example FF, a system comprising: control circuitry; and memory communicatively coupled to the control circuitry and storing executable instructions that, when executed by the control circuitry, cause the control circuitry to perform operations comprising: obtaining data; determining a first coordinate for a first point based at least in part on a first set of bits in the data and determining a second coordinate for the first point based at least in part on a second set of bits in the data that is adjacent to the first set of bits; determining a first coordinate for a second point based at least in part on a third set of bits in the data and determining a second coordinate for the second point based at least in part on a fourth set of bits in the data that is adjacent to the third set of bits; generating an n-dimensional representation for the data based at least in part on the first point and the second point; and causing the n-dimensional representation to be processed with a machine-trained model that is configured to detect malware.

Example GG, the system of Example F, wherein the first set of bits comprises a first byte and the second set of bits comprises a second byte that is directly adjacent to the first byte.

Example HH, the system of Example F or G, wherein obtaining the data comprises retrieving data from a data store, the data comprising file system data.

Example II, the system of any of Examples F-H, wherein the operations further comprise: extracting a first portion of the data and refraining from extracting a second portion of the data, the first portion of the data including the first set of bits and the second set of bits.

Example JJ, the system of any of Examples F-I, wherein the operations further comprise: determining a type of the data; and determining to represent the data with a first portion of the data based at least in part on the type of the data, the first portion of the data including the first set of bits and the second set of bits.

Example KK, the system of any of Examples F-J, wherein the first portion of the data includes at least one of a header, a body, or a footer.

Example LL, the system of any of Examples F-K, wherein the operations further comprise: determining a type of the data; and determining to represent the data with a first portion of the data and a second portion of the data based at least in part on the type of the data, the first portion of the data including the first set of bits and the second set of bits.

Example MM, the system of any of Examples F-L, wherein the operations further comprise: training a model to create the machine-trained model, the training being based at least in part on one or more n-dimensional representations that are tagged as being associated with malware and one or more n-dimensional representations that are tagged as being malware free.

Example NN, one or more non-transitory computer-readable media storing computer-executable instructions that, when executed, instruct one or more processors to perform operations comprising: obtaining data; determining a first coordinate for a first point based at least in part on a first set of bits in the data and determining a second coordinate for the first point based at least in part on a second set of bits in the data that is adjacent to the first set of bits; determining a first coordinate for a second point based at least in part on a third set of bits in the data and determining a second coordinate for the second point based at least in part on a fourth set of bits in the data that is adjacent to the third set of bits; generating an n-dimensional representation for the data based at least in part on the first and second coordinates for the first point and the first and second coordinates for the second point; and causing the n-dimensional representation to be processed with a machine-trained model that is configured to detect a threat.

Example OO, the one or more non-transitory computer-readable media of Example N, wherein the data comprises at least one of file system data, network traffic data, runtime data, or data associated with an isolated environment.

Example PP, the one or more non-transitory computer-readable media of Example N or O, wherein the operations further comprise: processing the n-dimensional representation with the machine-trained model; detecting the threat based at least in part on the processing; and performing a threat operation to address the threat, the threat operation comprising at least one of removing the threat, preventing the threat from associating with the data, or providing a notification to a computing device regarding the threat.

Example QQ, the one or more non-transitory computer-readable media of any of Examples N-P, wherein the first set of bits is directly adjacent to the second set of bits.

Example RR, the one or more non-transitory computer-readable media of any of Examples N-Q, wherein the operations further comprise: determining a type of the data; and determining to represent the data with a first portion of the data based at least in part on the type of the data, the first portion of the data including the first set of bits, the second set of bits, the third set of bits, and the fourth set of bits.

Example SS, the one or more non-transitory computer-readable media of any of Examples N-R, wherein the operations further comprise: training a model to create the machine-trained model, the training being based at least in part on one or more n-dimensional representations that are tagged as being associated with one or more threats and one or more n-dimensional representations that are tagged as being threat free.

Example TT, the one or more non-transitory computer-readable media of any of Examples N-S, wherein the machine-trained model includes an artificial neural network and the training includes using machine learning.

What is claimed is:

1. A system comprising:
control circuitry; and
memory communicatively coupled to the control circuitry and storing executable instructions that, when executed by the control circuitry, cause the control circuitry to perform operations comprising:
receiving network traffic data that includes a plurality of bits, the network traffic data being structured in a first format;
extracting a first set of bits from the plurality of bits;
determining a first coordinate for a first point based on the first set of bits;
extracting a second set of bits from the plurality of bits;
determining a second coordinate for the first point based on the second set of bits;
extracting a third set of bits from the plurality of bits;
determining a first coordinate for a second point based on the third set of bits;
extracting a fourth set of bits from the plurality of bits;
determining a second coordinate for the second point based on the fourth set of bits;
mapping the first point and the second point to an n-dimensional space;
using a pattern recognition algorithm to identify a set of points represented in the n-dimensional space;

generating an n-dimensional model for the set of points and storing n-dimension data for the n-dimensional model in a data structure;
processing the n-dimensional model with an Artificial Intelligence (AI) model that is configured to detect data security issues;
based on the processing, determining that the network traffic data includes a data security issue;
removing a portion of the network traffic data that is associated with the data security issue from the network traffic data; and
sending the network traffic data to a device.

2. The system of claim 1, wherein the processing is based on at least one of a shape of the n-dimensional model, a size of the n-dimensional model, a volume of the n-dimensional model, an area of the n-dimensional model, a number of surfaces of the n-dimensional model, a location of the n-dimensional model within the n-dimensional space, a position of the n-dimensional model relative to another n-dimensional model within the n-dimensional space, or a number of n-dimensional models within the n-dimensional space.

3. The system of claim 1, wherein the operations further comprise:
determining at least one of a type of the data security issue based on at least one of a shape of the n-dimensional model, a size of the n-dimensional model, a volume of the n-dimensional model, an area of the n-dimensional model, a number of surfaces of the n-dimensional model, a location of the n-dimensional model within the n-dimensional space, a position of the n-dimensional model relative to another n-dimensional model within the n-dimensional space, or a number of n-dimensional models within the n-dimensional space that are associated with the data security issue.

4. The system of claim 1, wherein the second set of bits are separated from the first set of bits by a particular number of bits.

5. The system of claim 1, wherein the third set of bits are separated from the second set of bits by a particular number of bits.

6. The system of claim 1, wherein the first and second sets of bits are located within a beginning portion of the network traffic data and the third and fourth sets of bits are located within an end portion of the network traffic data.

7. The system of claim 1, wherein the first, second, third, and fourth sets of bits each comprise a same number of bits.

8. A method comprising:
receiving, by control circuitry, network traffic data that includes a plurality of bits, the network traffic data being structured in a first format;
extracting, by the control circuitry, a first set of bits from the plurality of bits;
determining a set of coordinates for a first point based on the first set of bits;
extracting, by the control circuitry, a second set of bits from the plurality of bits;
determining a set of coordinates for a second point based on the second set of bits;
mapping, by the control circuitry, the first point and the second point to an n-dimensional space;
generating an n-dimensional model based on the first point and the second point;
processing the n-dimensional model with an Artificial Intelligence (AI) model that is configured to detect data security issues;
based on the processing, determining that the network traffic data includes a data security issue; and
removing a portion of the network traffic data that is associated with the data security issue from the network traffic data.

9. The method of claim 8, wherein the second set of bits are separated from the first set of bits by a particular number of bits within the plurality of bits.

10. The method of claim 8, wherein the first set of bits are located within a beginning portion of the network traffic data and the second set of bits are located within an end portion of the network traffic data.

11. The method of claim 8, wherein the first and second sets of bits each comprise a same number of bits.

12. The method of claim 8, further comprising:
generating a first confidence value from the processing, the first confidence value indicating a first likelihood that the network traffic data includes the data security issue;
processing the n-dimensional model with another AI model;
generating a second confidence value indicating a second likelihood that the network traffic data includes the data security issue; and
determining a composite confidence value for the network traffic data based on the first confidence value and the second confidence value;
wherein determining that the network traffic data includes the data security issue is based on the composite confidence value.

13. The method of claim 12, wherein the first likelihood indicates a likelihood that the network traffic data includes malware.

14. A network device comprising:
one or more network interfaces configured to receive, via a network connection, network traffic data that includes a plurality of bits;
memory storing executable instructions; and
control circuitry communicatively coupled to the memory and configured to execute the executable instructions to:
extract a first set of bits from the plurality of bits;
determine a set of coordinates for a first point based on the first set of bits;
extract a second set of bits from the plurality of bits;
determine a set of coordinates for a second point based on the second set of bits;
map the first point and the second point to an n-dimensional space;
generate an n-dimensional model based on the first point and the second point;
process the n-dimensional model with an Artificial Intelligence (AI) model that is configured to detect data security issues;
based on the processing, determine that the network traffic data includes a data security issue; and
remove a portion of the network traffic data that is associated with the data security issue from the network traffic data.

15. The network device of claim 14, wherein the second set of bits are separated from the first set of bits by a particular number of bits within the plurality of bits.

16. The network device of claim 14, wherein the first set of bits are located within a beginning portion of the network traffic data and the second set of bits are located within an end portion of the network traffic data.

17. The network device of claim 14, wherein the first and second sets of bits each comprise a same number of bits.

18. The network device of claim 14, wherein the control circuitry is further configured to:
generate a first confidence value from the processing, the first confidence value indicating a first likelihood that the network traffic data includes the data security issue;
process the n-dimensional model with another AI model;
generate a second confidence value indicating a second likelihood that the network traffic data includes the data security issue; and
determine a composite confidence value for the network traffic data based on the first confidence value and the second confidence value;
wherein the control circuitry is configured to determine that the network traffic data includes the data security issue is based on the composite confidence value.

19. The network device of claim 18, wherein the first likelihood indicates a likelihood that the network traffic data includes malware.

20. The network device of claim 18, wherein the control circuitry is configured to determine that the network traffic data includes the data security issue by comparing the composite confidence value to a threshold.

* * * * *